United States Patent
Tabushi

(10) Patent No.: US 11,132,588 B2
(45) Date of Patent: Sep. 28, 2021

(54) DATA GENERATING APPARATUS, COMPUTER-READABLE MEDIUM, AND METHOD FOR SUPPRESSING ADVERSE INFLUENCES ON IMAGE DATA GENERATION DUE TO INSUFFICIENT MEMORY CAPACITY

(71) Applicant: BROTHER KOGYO KABUSHIKI KAISHA, Nagoya (JP)

(72) Inventor: Chika Tabushi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/098,064

(22) Filed: Nov. 13, 2020

(65) Prior Publication Data

US 2021/0150291 A1    May 20, 2021

(30) Foreign Application Priority Data

Nov. 15, 2019 (JP) .............................. JP2019-206756

(51) Int. Cl.
*G06K 15/02* (2006.01)
(52) U.S. Cl.
CPC ....... *G06K 15/1861* (2013.01); *G06K 15/181* (2013.01); *G06K 15/1822* (2013.01); *G06K 15/1832* (2013.01); *G06K 15/1835* (2013.01)
(58) Field of Classification Search
None
See application file for complete search history.

(56) References Cited

U.S. PATENT DOCUMENTS

| 2007/0296749 A1 | 12/2007 | Mizutani et al. |
| 2008/0030760 A1* | 2/2008 | Tanaka ................ G06K 15/186 358/1.13 |
| 2010/0079808 A1 | 4/2010 | Mizutani |
| 2011/0216086 A1 | 9/2011 | Hitosugi |

(Continued)

FOREIGN PATENT DOCUMENTS

| JP | 2007-76292 A | 3/2007 |
| JP | 2007-82068 A | 3/2007 |
| JP | 2008-1068 A | 1/2008 |

(Continued)

*Primary Examiner* — Lennin R Rodriguezgonzalez
(74) *Attorney, Agent, or Firm* — Scully, Scott, Murphy & Presser, PC

(57) ABSTRACT

A data generating apparatus includes a controller to perform a first process to generate and store into a work area n pieces of first-layer object data representing n objects having earlier orders than a combined object in a combining sequence, a second process to generate and store into the work area M pieces of second-layer object data representing M second-layer objects of the combined object, a third process to generate first bitmap data representing an image obtained by combining the n first-layer objects, using the n pieces of first-layer object data, and a fourth process to generate second bitmap data representing the combined object. When a free space is less than a reference value during the second process, the controller interrupts the second process, performs the third process or a part of the fourth process, releases a storage area for object data, and thereafter resumes and completes the second process.

13 Claims, 15 Drawing Sheets

(56) References Cited

U.S. PATENT DOCUMENTS

2012/0062958 A1* 3/2012 Kim ................ G06K 15/181
                                                358/3.06

FOREIGN PATENT DOCUMENTS

| JP | 2009-276839 A | 11/2009 |
| JP | 2010-105388 A | 5/2010 |
| JP | 2010-171682 A | 8/2010 |
| JP | 2011-180896 A | 9/2011 |

* cited by examiner

TARGET IMAGE

TARGET IMAGE DATA

OBJECTS in 0th LAYER
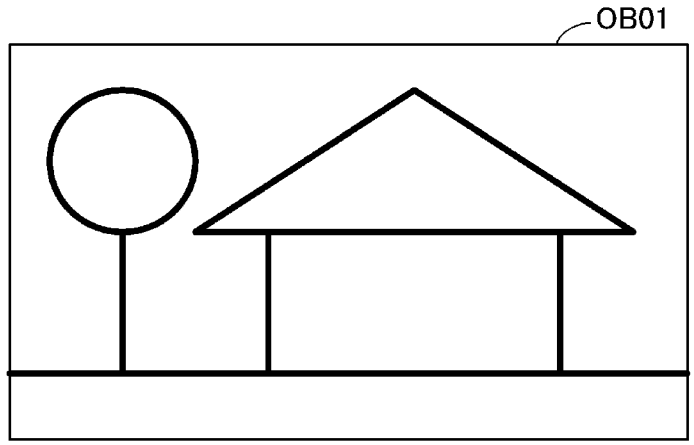
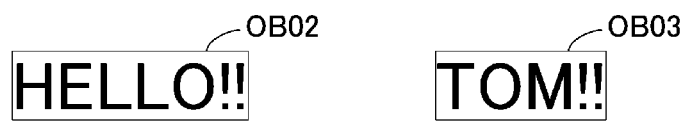
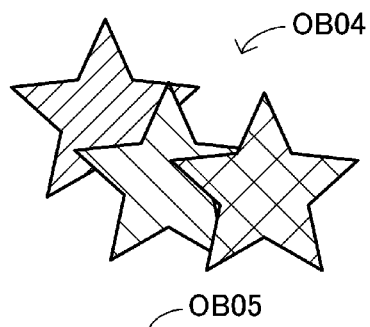
FIG. 4A
OBJECTS in 1st LAYER
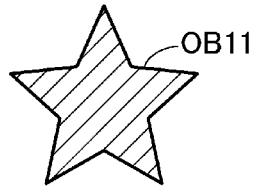 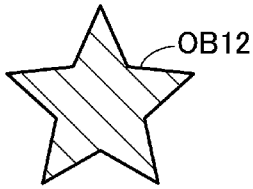 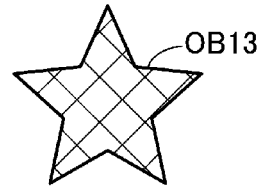
FIG. 4B

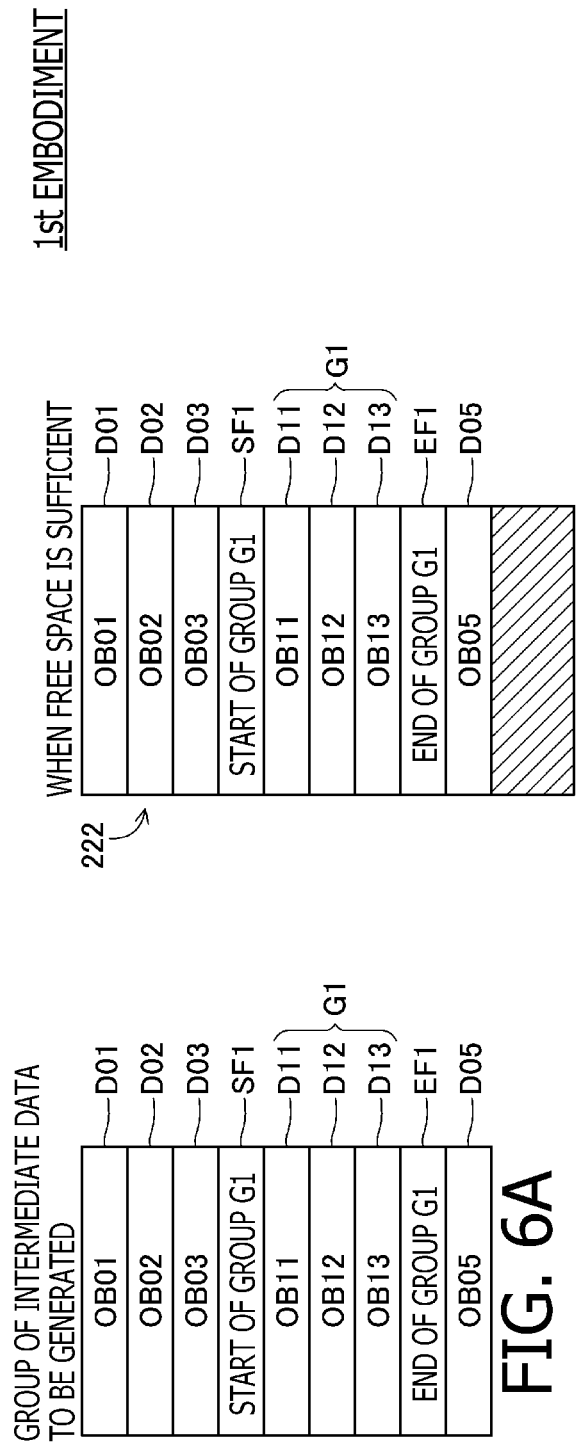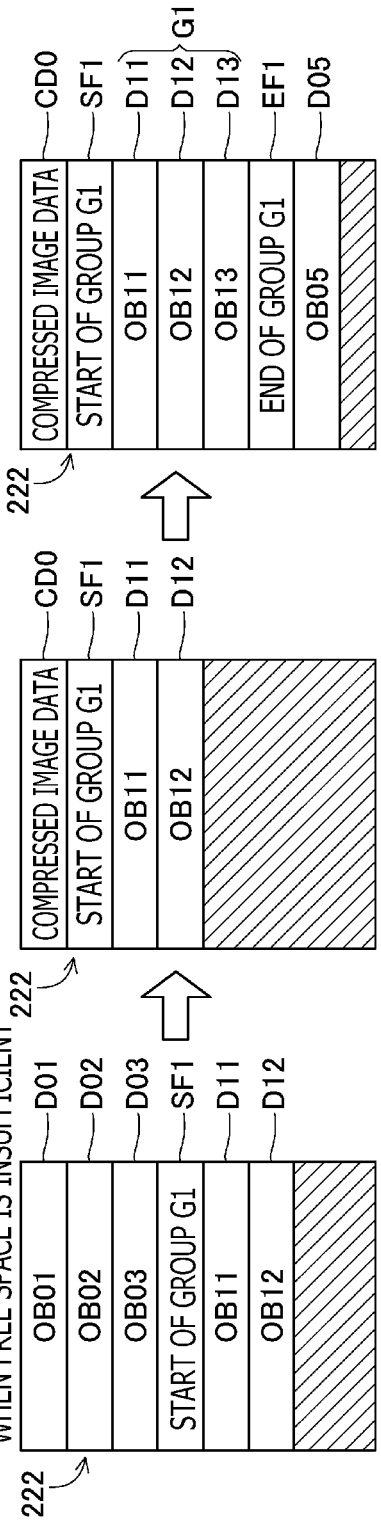

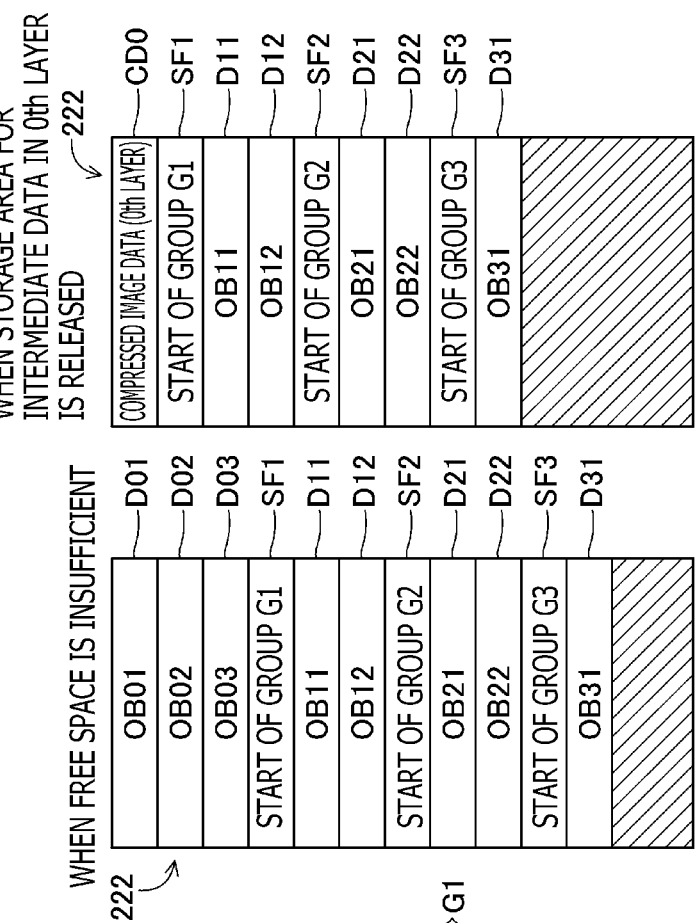
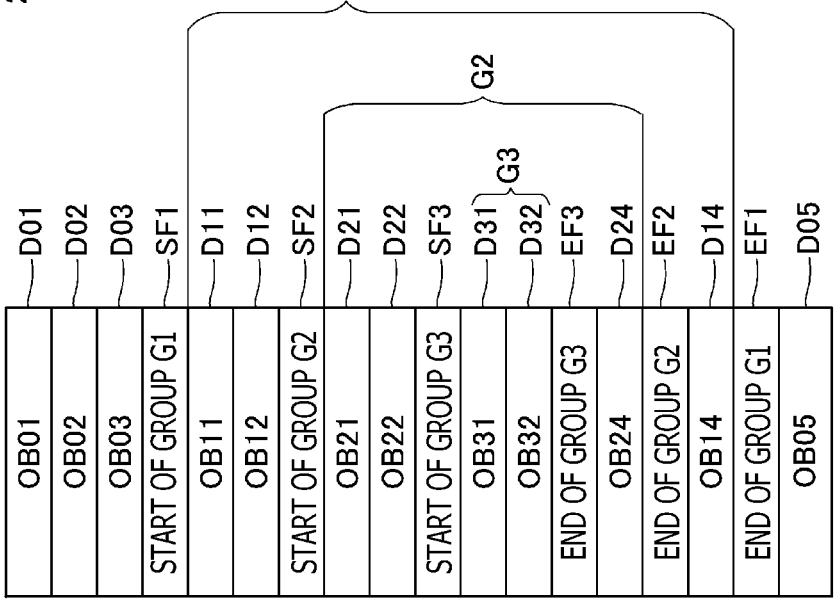

2nd EMBODIMENT

| LAYER | GROUP ID | LAYER COORDINATE INFORMATION | PIXEL SIZE | AREA SIZE | COMPRESSION SIZE | TOTAL COMPRESSION SIZE | INTERMEDIATE DATA SIZE | RELEASABLE SIZE | INCREASE IN FREE SPACE |
|---|---|---|---|---|---|---|---|---|---|
| 0 | — | Xr0,Yt0,Xl0,Yb0 | Ps0 | As0 | Cs0 | TCs0 | Is0 | Fs0 | ΔD0 |
| 1 | G1 | Xr1,Yt1,Xl1,Yb1 | Ps1 | As1 | Cs1 | TCs1 | Is1 | Fs1 | ΔD1 |
| 2 | G2 | Xr2,Yt2,Xl2,Yb2 | Ps2 | As2 | Cs2 | TCs2 | Is2 | Fs2 | ΔD2 |
| 3 | G3 | Xr3,Yt3,Xl3,Yb3 | Ps3 | As3 | Cs3 | TCs3 | Is3 | Fs3 | ΔD3 |

2nd EMBODIMENT

DATA GENERATING APPARATUS, COMPUTER-READABLE MEDIUM, AND METHOD FOR SUPPRESSING ADVERSE INFLUENCES ON IMAGE DATA GENERATION DUE TO INSUFFICIENT MEMORY CAPACITY

CROSS-REFERENCE TO RELATED APPLICATION

This application claims priority under 35 U.S.C. § 119 from Japanese Patent Application No. 2019-206756 filed on Nov. 15, 2019. The entire subject matter of the application is incorporated herein by reference.

BACKGROUND

Technical Field

Aspects of the present disclosure are related to a data generating apparatus, non-transitory computer-readable medium, and a method for generating bitmap data using image data representing an image according to a particular description language.

Related Art

A technology has been known in which, to convert PDF print data into bitmap data, a printer allows a user to make a selection as to whether to perform transparency object processing after reducing a resolution of the PDF print data or perform normal processing for the PDF print data, when it is determined that an image to be printed includes an object which requires the transparency object processing and that the memory capacity is insufficient. In the technology, the printer performs the processing selected by the user.

SUMMARY

In the above known technology, an alternative process such as reducing the resolution or the normal processing is performed when the insufficient memory capacity has adverse influences on the originally-intended process (e.g., transparency object processing) to generate the bitmap data that is supposed to be performed. However, in the technology, there is no creative solution to suppress the adverse influences on the originally-intended process. Further, although the generation of the bitmap data may require a process of grouping a plurality of objects into a plurality of hierarchical layers, the technique does not take such a case into consideration.

Aspects of the present disclosure are advantageous to provide one or more improved techniques to suppress adverse influences on generation of bitmap data due to insufficient memory capacity in generating the bitmap data after grouping a plurality of objects into a plurality of hierarchical layers.

According to aspects of the present disclosure, a data generating apparatus is provided, which includes a memory having a work area, and a controller. The controller is configured to obtain first image data that represents a target image in accordance with a particular description language, the target image including an image obtained by combining N ("N" is an integer equal to or more than 2) first-layer objects in a first combining sequence, the N first-layer objects including a combined image obtained by combining M ("M" is an integer equal to or more than 2) second-layer objects in a second combining sequence, at least one of combining the M second-layer objects and combining the combined object with the other first-layer objects including a color mixing process, and perform, using the work area, a generation process to generate second image data that represents the target image based on the obtained first image data, the second image data being bitmap data including a plurality of pieces of pixel data. The generation process includes a first process including analyzing the first image data to generate n ("n" is an integer equal to or more than 1 and less than N) pieces of first-layer object data, the n pieces of first-layer object data representing n first-layer objects that have respective earlier orders than the combined object in the first combining sequence, among the N first-layer objects, and storing the generated n pieces of first-layer object data into the work area, a second process including analyzing, after completion of the first process, the first image data to generate M pieces of second-layer object data representing the M second-layer objects, and storing the generated M pieces of second-layer object data into the work area, a third process to generate, using the n pieces of first-layer object data, first bitmap data representing an image obtained by combining the n first-layer objects, a fourth process to generate, using the M pieces of second-layer object data, second bitmap data representing an image obtained by combining the M second-layer objects, and a fifth process to generate the second image data using the first bitmap data and the second bitmap data. The controller is further configured to determine whether a free space in the work area is less than a first reference value, during the second process, in a first case of determining that the free space in the work area is less than the first reference value during the second process, perform interrupting the second process, and performing the third process, releasing, after completion of the third process, a storage area for the n pieces of first-layer object data in the work area, and completing the second process after the storage area for the n pieces of first-layer object data is released, and in a second case of not determining that the free space in the work area is less than the first reference value during the second process, perform the third process after completing the second process.

According to aspects of the present disclosure, further provided is a data generating apparatus including a memory having a work area, and a controller. The controller is configured to obtain first image data that represents a target image in accordance with a particular description language, the target image including an image obtained by combining N ("N" is an integer equal to or more than 2) first-layer objects in a first combining sequence, the N first-layer objects including a combined image obtained by combining M ("M" is an integer equal to or more than 2) second-layer objects in a second combining sequence, at least one of combining the M second-layer objects and combining the combined object with the other first-layer objects including a color mixing process, and perform, using the work area, a generation process to generate second image data that represents the target image based on the obtained first image data, the second image data being bitmap data including a plurality of pieces of pixel data. The generation process includes a first process including analyzing the first image data to generate n ("n" is an integer equal to or more than 1 and less than N) pieces of first-layer object data, the n pieces of first-layer object data representing n first-layer objects that have respective earlier orders than the combined object in the first combining sequence, among the N first-layer objects, and storing the generated n pieces of first-layer object data into the work area, a second process including analyzing, after completion of the first process, the first image data to generate M pieces of second-layer object data representing the M second-layer objects, and storing the generated M pieces of second-layer object data into the work area, a third process to generate, using the n pieces of first-layer object data, first bitmap data representing an image obtained by combining the n first-layer objects, a fourth process to generate, using the M pieces of second-layer object data, second bitmap data representing an image obtained by combining the M second-layer objects, and a fifth process to generate the second image data using the first bitmap data and the second bitmap data. The controller is further configured to determine whether a free space in the work area is less than a reference value, during the second process, and when determining that the free space in the work area is less than the reference value during the second process, perform interrupting the second process, and performing a part of the fourth process by generating third bitmap data using m1 ("m1" is an integer less than M) pieces of second-layer object data that have been stored in the work area at a time of the interruption of the second process among the M pieces of second-layer object data, the third bitmap data representing an image obtained by combining m1 second-layer objects, releasing, after the generation of the third bitmap data, a storage area for the m1 pieces of second-layer object data in the work area, generating, after the storage area for the m1 pieces of second-layer object data is released, m2 ("m2" is an integer equal to or less than (M-m1)) pieces of second-layer object data that have not been generated at the time of the interruption of the second process among the M pieces of second-layer object data, and storing the m2 pieces of second-layer object data into the work area, thereby completing the second process, and after the completion of the second process, generating the second bitmap data using the third bitmap data and the m2 second-layer object data, thereby completing the fourth process, and when not determining that the free space in the work area is less than the reference value during the second process, perform the fourth process using the M pieces of second-layer object data stored in the work area, after completing the second process.

According to aspects of the present disclosure, further provided is a non-transitory computer-readable medium storing computer-readable instructions that are executable by a processor of a data generating apparatus including a memory having a work area. The instructions are configured to, when executed by the processor, cause the processor to obtain first image data that represents a target image in accordance with a particular description language, the target image including an image obtained by combining N ("N" is an integer equal to or more than 2) first-layer objects in a first combining sequence, the N first-layer objects including a combined image obtained by combining M ("M" is an integer equal to or more than 2) second-layer objects in a second combining sequence, at least one of combining the M second-layer objects and combining the combined object with the other first-layer objects including a color mixing process, and perform, using the work area, a generation process to generate second image data that represents the target image based on the obtained first image data, the second image data being bitmap data including a plurality of pieces of pixel data. The generation process includes a first process including analyzing the first image data to generate n ("n" is an integer equal to or more than 1 and less than N) pieces of first-layer object data, the n pieces of first-layer object data representing n first-layer objects that have respective earlier orders than the combined object in the first combining sequence, among the N first-layer objects, and storing the generated n pieces of first-layer object data into the work area, a second process including analyzing, after completion of the first process, the first image data to generate M pieces of second-layer object data representing the M second-layer objects, and storing the generated M pieces of second-layer object data into the work area, a third process to generate, using the n pieces of first-layer object data, first bitmap data representing an image obtained by combining the n first-layer objects, a fourth process to generate, using the M pieces of second-layer object data, second bitmap data representing an image obtained by combining the M second-layer objects, and a fifth process to generate the second image data using the first bitmap data and the second bitmap data. The instructions are further configured to, when executed by the processor, cause the processor to determine whether a free space in the work area is less than a first reference value, during the second process, in a first case of determining that the free space in the work area is less than the first reference value during the second process, perform interrupting the second process, and performing the third process, releasing, after completion of the third process, a storage area for the n pieces of first-layer object data in the work area, and after the storage area for the n pieces of first-layer object data is released, completing the second process, and in a second case of not determining that the free space in the work area is less than the first reference value during the second process, perform the third process after completing the second process.

According to aspects of the present disclosure, further provided is a non-transitory computer-readable medium storing computer-readable instructions that are executable by a processor of a data generating apparatus including a memory having a work area. The instructions are configured to, when executed by the processor, cause the processor to obtain first image data that represents a target image in accordance with a particular description language, the target image including an image obtained by combining N ("N" is an integer equal to or more than 2) first-layer objects in a first combining sequence, the N first-layer objects including a combined image obtained by combining M ("M" is an integer equal to or more than 2) second-layer objects in a second combining sequence, at least one of combining the M second-layer objects and combining the combined object with the other first-layer objects including a color mixing process, and perform, using the work area, a generation process to generate second image data that represents the target image based on the obtained first image data, the second image data being bitmap data including a plurality of pieces of pixel data. The generation process includes a first process including analyzing the first image data to generate n ("n" is an integer equal to or more than 1 and less than N) pieces of first-layer object data, the n pieces of first-layer object data representing n first-layer objects that have respective earlier orders than the combined object in the first combining sequence, among the N first-layer objects, and storing the generated n pieces of first-layer object data into the work area, a second process including analyzing, after completion of the first process, the first image data to generate M pieces of second-layer object data representing the M second-layer objects, and storing the generated M pieces of second-layer object data into the work area, a third process to generate, using the n pieces of first-layer object data, first bitmap data representing an image obtained by combining the n first-layer objects, a fourth process to generate, using the M pieces of second-layer object data, second bitmap data representing an image obtained by combining the M second-layer objects, and a fifth process to generate the second image data using the first bitmap data and the second bitmap data. The instructions are further configured to, when executed by the processor, cause the processor to determine whether a free space in the work area is less than a reference value, during the second process, when determining that the free space in the work area is less than the reference value during the second process, perform interrupting the second process, and performing a part of the fourth process by generating third bitmap data using m1 ("m1" is an integer less than M) pieces of second-layer object data that have been stored in the work area at a time of the interruption of the second process among the M pieces of second-layer object data, the third bitmap data representing an image obtained by combining m1 second-layer objects, releasing, after the generation of the third bitmap data, a storage area for the m1 pieces of second-layer object data in the work area, generating, after the storage area for the m1 pieces of second-layer object data is released, m2 ("m2" is an integer equal to or less than (M-m1)) pieces of second-layer object data that have not been generated at the time of the interruption of the second process among the M pieces of second-layer object data, and storing the m2 pieces of second-layer object data into the work area, thereby completing the second process, and after the completion of the second process, generating the second bitmap data using the third bitmap data and the m2 second-layer object data, thereby completing the fourth process, and when not determining that the free space in the work area is less than the reference value during the second process, perform the fourth process using the M pieces of second-layer object data stored in the work area, after completing the second process.

According to aspects of the present disclosure, further provided is a method implementable on a processor of a data generating apparatus including a memory having a work area. The method includes obtaining first image data that represents a target image in accordance with a particular description language, the target image including an image obtained by combining N ("N" is an integer equal to or more than 2) first-layer objects in a first combining sequence, the N first-layer objects including a combined image obtained by combining M ("M" is an integer equal to or more than 2) second-layer objects in a second combining sequence, at least one of combining the M second-layer objects and combining the combined object with the other first-layer objects including a color mixing process, and performing, using the work area, a generation process to generate second image data that represents the target image based on the obtained first image data, the second image data being bitmap data including a plurality of pieces of pixel data. The generation process includes a first process including analyzing the first image data to generate n ("n" is an integer equal to or more than 1 and less than N) pieces of first-layer object data, the n pieces of first-layer object data representing n first-layer objects that have respective earlier orders than the combined object in the first combining sequence, among the N first-layer objects, and storing the generated n pieces of first-layer object data into the work area, a second process including analyzing, after completion of the first process, the first image data to generate M pieces of second-layer object data representing the M second-layer objects, and storing the generated M pieces of second-layer object data into the work area, a third process to generate, using the n pieces of first-layer object data, first bitmap data representing an image obtained by combining the n first-layer objects, a fourth process to generate, using the M pieces of second-layer object data, second bitmap data representing an image obtained by combining the M second-layer objects, and a fifth process to generate the second image data using the first bitmap data and the second bitmap data. The method further includes determining whether a free space in the work area is less than a first reference value, during the second process, in a first case of determining that the free space in the work area is less than the first reference value during the second process, performing interrupting the second process, and performing the third process, releasing, after completion of the third process, a storage area for the n pieces of first-layer object data in the work area, and after the storage area for the n pieces of first-layer object data is released, completing the second process, and in a second case of not determining that the free space in the work area is less than the first reference value during the second process, performing the third process after completing the second process.

According to aspects of the present disclosure, further provided is a method implementable on a processor of a data generating apparatus including a memory having a work area. The method includes obtaining first image data that represents a target image in accordance with a particular description language, the target image including an image obtained by combining N ("N" is an integer equal to or more than 2) first-layer objects in a first combining sequence, the N first-layer objects including a combined image obtained by combining M ("M" is an integer equal to or more than 2) second-layer objects in a second combining sequence, at least one of combining the M second-layer objects and combining the combined object with the other first-layer objects including a color mixing process, and performing, using the work area, a generation process to generate second image data that represents the target image based on the obtained first image data, the second image data being bitmap data including a plurality of pieces of pixel data. The generation process includes a first process including analyzing the first image data to generate n ("n" is an integer equal to or more than 1 and less than N) pieces of first-layer object data, the n pieces of first-layer object data representing n first-layer objects that have respective earlier orders than the combined object in the first combining sequence, among the N first-layer objects, and storing the generated n pieces of first-layer object data into the work area, a second process including analyzing, after completion of the first process, the first image data to generate M pieces of second-layer object data representing the M second-layer objects, and storing the generated M pieces of second-layer object data into the work area, a third process to generate, using the n pieces of first-layer object data, first bitmap data representing an image obtained by combining the n first-layer objects, a fourth process to generate, using the M pieces of second-layer object data, second bitmap data representing an image obtained by combining the M second-layer objects, and a fifth process to generate the second image data using the first bitmap data and the second bitmap data. The method further includes determining whether a free space in the work area is less than a reference value, during the second process, when determining that the free space in the work area is less than the reference value during the second process, performing interrupting the second process, and performing a part of the fourth process by generating third bitmap data using m1 ("m1" is an integer less than M) pieces of second-layer object data that have been stored in the work area at a time of the interruption of the second process among the M pieces of second-layer object data, the third bitmap data representing an image obtained by combining m1 second-layer objects, releasing, after the generation of the third bitmap data, a storage area for the m1 pieces of second-layer object data in the work area, generating, after the storage area for the m1 pieces of second-layer object data is released, m2 ("m2" is an integer equal to or less than (M-m1)) pieces of second-layer object data that have not been generated at the time of the interruption of the second process among the M pieces of second-layer object data, and storing the m2 pieces of second-layer object data into the work area, thereby completing the second process, and after the completion of the second process, generating the second bitmap data using the third bitmap data and the m2 second-layer object data, thereby completing the fourth process, and when not determining that the free space in the work area is less than the reference value during the second process, performing the fourth process using the M pieces of second-layer object data stored in the work area, after completing the second process.

BRIEF DESCRIPTION OF THE ACCOMPANYING DRAWINGS

FIG. 4A shows examples of objects in a zeroth layer that are included in the target image shown in FIG. 3A, in the first illustrative embodiment according to one or more aspects of the present disclosure.

FIG. 4B shows examples of objects in a first layer that constitute a combined object shown in FIG. 4A, in the first illustrative embodiment according to one or more aspects of the present disclosure.

FIG. 6A shows a group of intermediate data to be generated, in the first illustrative embodiment according to one or more aspects of the present disclosure.

FIG. 6B illustrates a work area with a sufficient free space, in a volatile memory of the printer in the first illustrative embodiment according to one or more aspects of the present disclosure.

FIG. 6C illustrates a processing procedure when the free space in the work area is insufficient, in the first illustrative embodiment according to one or more aspects of the present disclosure.

FIG. 11A shows a group of intermediate data to be generated, in the second illustrative embodiment according to one or more aspects of the present disclosure.

FIG. 11B illustrates a state of the work area with an insufficient free space, in the second illustrative embodiment according to one or more aspects of the present disclosure.

FIG. 11C illustrates a state of the work area after a storage area for intermediate data in the zeroth layer is released, in the second illustrative embodiment according to one or more aspects of the present disclosure.

FIG. 12 shows an example of a management table in the volatile memory of the printer in the second illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

A. First Illustrative Embodiment

A-1. Configuration of Data Generating Apparatus

Figure 1:
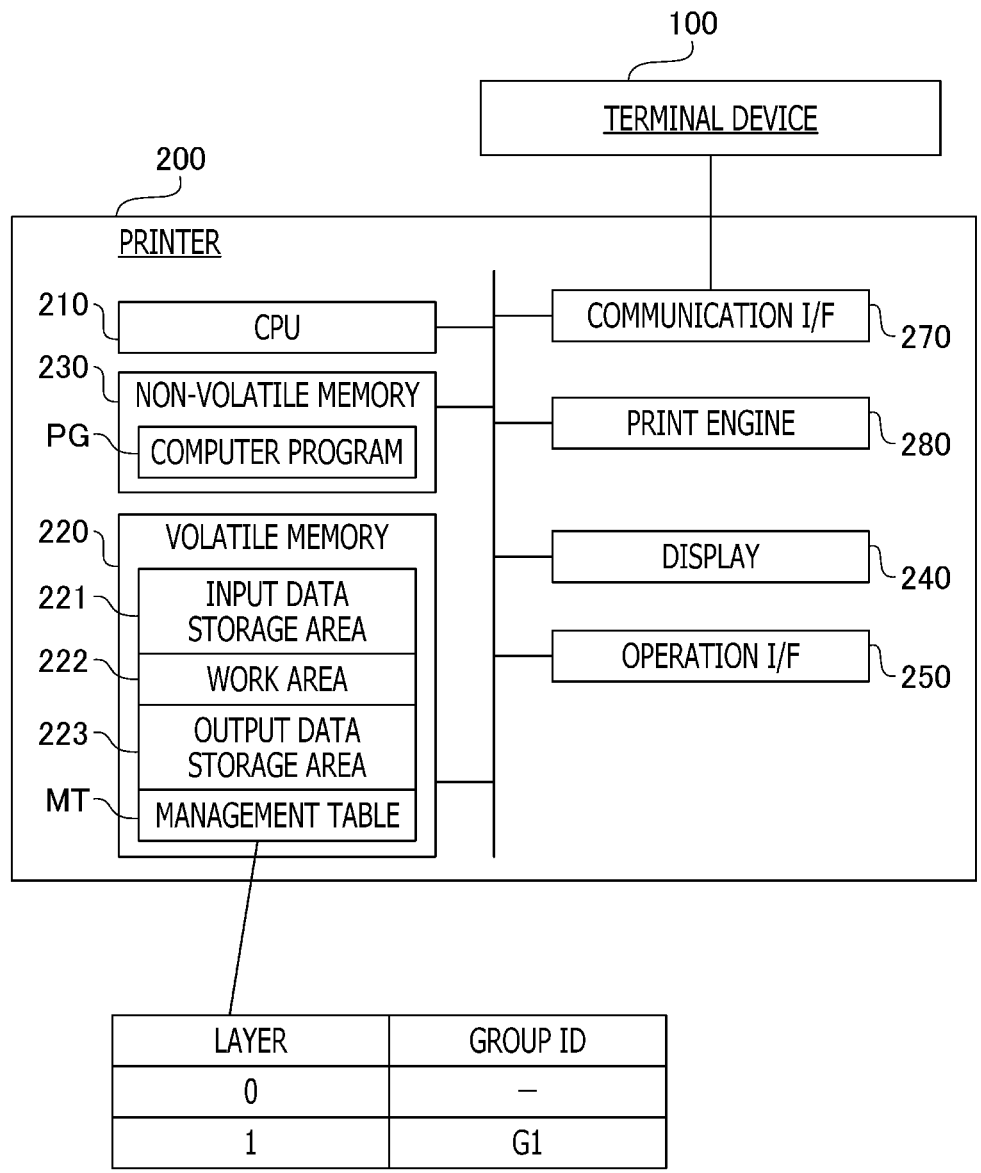
FIG. 1 is a block diagram showing a configuration of a printer communicably connected with a terminal device, in a first illustrative embodiment according to one or more aspects of the present disclosure.

Hereinafter, a first illustrative embodiment according to aspects of the present disclosure will be described with reference to the accompanying drawings. FIG. 1 is a block diagram showing configurations of a terminal device 100 and a printer 200 as a data generating apparatus in the first illustrative embodiment.

The printing device 200 includes a CPU 210 as a controller of the printer 200, a volatile memory 220 such as a RAM, a non-volatile memory 230 such as a hard disk drive and a flash memory, a display 240 such as an LCD ("LCD" is an abbreviation for "Liquid Crystal Display"), an operation I/F ("I/F" is an abbreviation for "interface") 250 such as buttons and a touch panel superimposed on the LCD, a communication I/F 270, and a print engine 280. The printer 200 is communicably connected with external devices such as the terminal device 100 via the communication I/F 270. For instance, the communication I/F 270 may be a USB I/F, a wired LAN I/F, a wireless LAN I/F compliant with IEEE802.11.

The volatile memory 220 provides memory areas for storing various types of data in a below-mentioned printing process. Specifically, the volatile memory 220 has an input data storage area 221, a work area 222, and an output data storage area 223. The input data storage area 221 is for storing input date for the printing process, for instance, in the first illustrative embodiment, target image data obtained from the terminal device 100. The work area 222 is for temporarily storing data (e.g., below-mentioned intermediate data) generated during the printing process. The work area 222 may be referred to as a "working memory." The output data storage area 223 is for storing output data of the printing process, for instance, in the first illustrative embodiment, print data generated using the target image data. The output data storage area 223 may be referred to as a "page memory." Further, the volatile memory 220 stores a management table MT used in the printing process. The non-volatile memory 230 stores a computer program PG.

For instance, the computer program PG may be previously stored in the non-volatile memory 230 at the time when the printer 200 is manufactured. In another instance, the computer program PG may be downloaded from a server connected with the printer 200 via the Internet, or may be provided in a form stored in a CD-ROM. The CPU 210 performs the below-mentioned printing process by executing the computer program PG.

In the first illustrative embodiment, the print engine 280 is an inkjet printing mechanism configured to print color images with four different types of ink of cyan (C), magenta (M), yellow (Y), and black (K). Instead, the print engine 280 may be a laser printing mechanism configured to print color images with toner as color materials.

The terminal device 100 is a computer (e.g., a PC or a smartphone) used by users of the printer 200. The terminal device 100 executes a driver program provided by a manufacturer of the printer 200, thereby operating as a printer driver for the printer 200. For instance, the terminal device 100, as the printer driver, may send a print instruction to the printer 200 and cause the printer 200 to perform printing.

A-2. Printing Process

Figure 2:
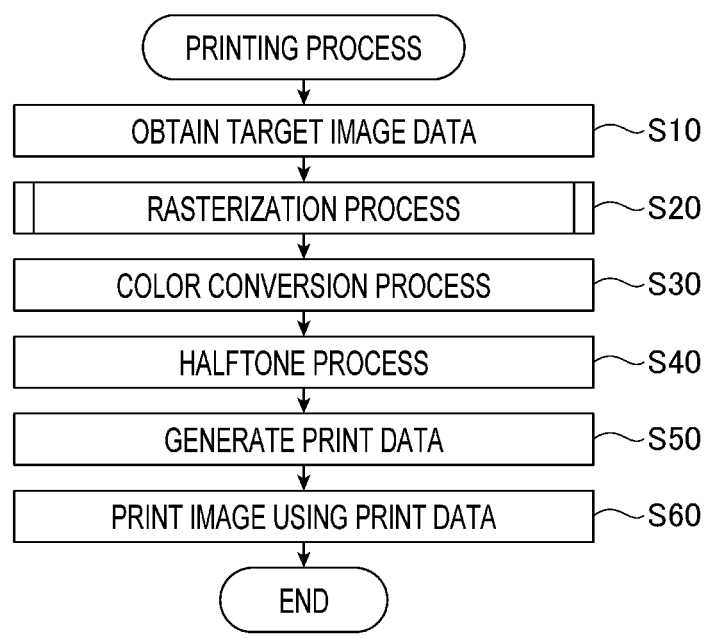
FIG. 2 is a flowchart showing a procedure of a printing process by a CPU of the printer in the first illustrative embodiment according to one or more aspects of the present disclosure.

FIG. 2 is a flowchart showing a procedure of the printing process. This printing process is a process of causing the print engine 280 to print a target image by using target image data. The printing process is performed by the CPU 210 of the printer 200. The printing process is started when the printer 200 receives a print instruction from a user, for instance, via the operation I/F 250 or the terminal device 100.

In the printing process, the CPU 210 first obtains the target image data representing the target image to be printed (S10). For instance, the target image data may be selected by the user from among a plurality of pieces of image data stored in the non-volatile memory 230. In another instance, the target image data may be transmitted from the terminal device 100 with the print instruction.

In the first illustrative embodiment, the target image data represents the target image, for instance, according to a particular page description language. Specifically, in the first illustrative embodiment, the target image data is a PDF ("PDF" is an abbreviation for "Portable Document Format") file. The PDF file is a file in which the target image is described in a PostScript-based description language. It is noted that PostScript is registered trademark.

The target image data, which is a PDF file, may represent a plurality of images corresponding to a plurality of pages. Nonetheless, in the first illustrative embodiment, the following description will be provided based on an assumption that the target image data represents one target image corresponding to one page, for the sake of brevity. When the target image data represents a plurality of target images corresponding to a plurality of pages, the below-mentioned printing process is performed for each target image.

Figure 3A:
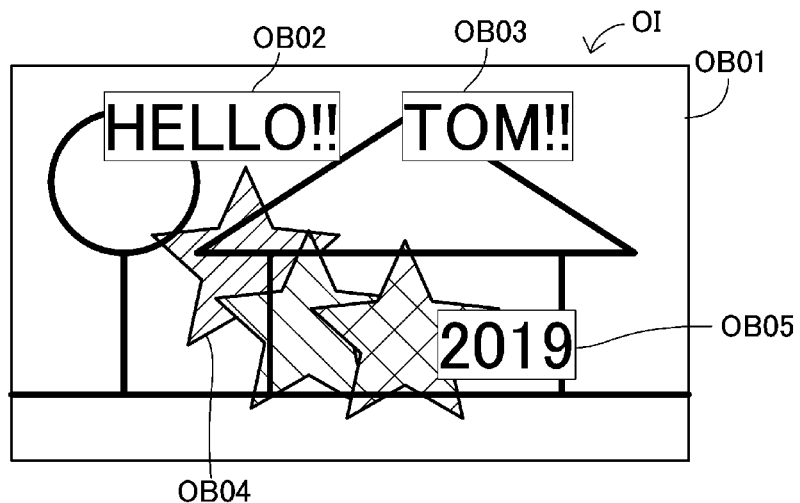
FIG. 3A shows an example of a target image in the first illustrative embodiment according to one or more aspects of the present disclosure.
Figure 3B:
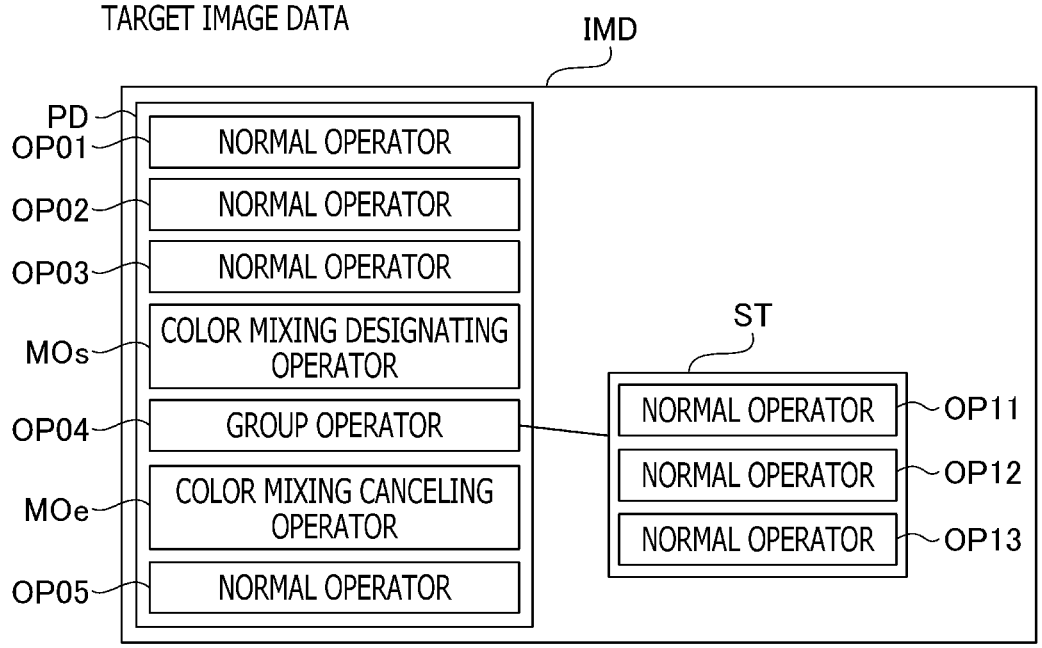
FIG. 3B shows an example of target image data corresponding to the target image shown in FIG. 3A, in the first illustrative embodiment according to one or more aspects of the present disclosure.

FIG. 3A shows an example of the target image. Further, FIG. 3B shows an example of the target image data representing the target image. FIGS. 4A and 4B show examples of objects. The target image OI shown in FIG. 3A includes five objects OB01 to OB05 shown in FIG. 4A. The object image OI is an image obtained by combining these objects OB01 to OB05 in a specified combining sequence. Numbers "1" to "5" at the ends of the reference characters for the objects OB01 to OB05 indicate respective orders of the objects OB01 to OB05 in the combining sequence.

In the example shown in FIGS. 3A to 4B, the object OB01 is a photograph, and the objects OB02, OB03, and OB05 are texts. The object OB04 is a combined object obtained by combining three objects OB11 to OB13 shown in FIG. 4B in a specified combining sequence. Numbers "1" to "3" at the end of the reference characters for the objects OB11 to OB13 indicate respective orders of the objects OB11 to OB13 in the combining sequence. The three objects OB11-OB13, included in the combined object OB04, are graphics. Graphics may include, but are not limited to, illustrations, tables, line drawings, and patterns. An object that is different from a combined object may be referred to as a "stand-alone object."

In the first illustrative embodiment, the object combining includes two types of combining, i.e., simple combining and color mixture combining. In the simple combining, in an overlapping region where a plurality of objects to be combined overlap, a later-combined object in the combining sequence is superimposed on an earlier-combined object in the combining sequence. Suppose for instance that combined bitmap data C is generated using bitmap data A representing an earlier-combined object in the combining sequence and bitmap data B representing a later-combined object in the combining sequence. In this case, a process for the simple combining is a replacement process of replacing pixel values of the bitmap data A with corresponding pixel values of the bitmap data B in an overlapping region where the two objects overlap. Thus, the combined bitmap data C is generated by the replacement process.

In the color mixture combining, in an overlapping region where a plurality of objects to be combined overlap, a color obtained by mixing respective colors of the plurality of objects according to a particular rule is a color resulting from the color mixture combining. Suppose for instance that combined bitmap data F is generated using bitmap data D representing an earlier-combined object in the combining sequence and bitmap data E representing a later-combined object in the combining sequence. In this case, a process for the color mixture combining is a color mixing process in which pixel values of a combined image is determined according to a particular color mixing rule using pixel values of the bitmap data D and corresponding pixel values of the bitmap data E in an overlapping region where the two objects overlap. Thus, the combined bitmap data F is generated with the determined pixel values.

In the first illustrative embodiment, as the color mixing process, a transparentizing process is performed to combine a plurality of objects using a specified transmittance (also referred to as an "α value"). Thereby, a state is expressed by the combined image, in which the earlier-combined object in the combining sequence is viewed transmitted through the later-combined object in the combining sequence. What is applicable as the color mixing process is not limited to the transparentizing process but may be various processes. For instance, examples of the color mixing process may include processes for achieving various blending modes. Specifically, the processes for achieving various blending modes may include a process to employ a pixel value obtained by an arithmetic operation (e.g., multiplication, addition, subtraction, or division) for two corresponding pixel values. Further, the processes for achieving various blending modes may include a process to employ a pixel value having a feature value (e.g., lightness or saturation) higher (or lower) than a feature value of the other pixel value in comparison of the feature values of the two corresponding pixel values.

In the example in FIGS. 3A to 4B, the replacement process is performed to combine the three objects OB11 to OB13 included in the combined object OB04. In addition, the replacement process is performed to combine the objects OB01 to OB03. Further, the color mixing process (more specifically, the transparentizing process) is performed to combine an image obtained by combining the objects OB01 to OB03 with the combined object OB04. Moreover, the replacement process is performed to combine an image obtained by combining the objects OB01 to OB04 with the object OB05.

FIG. 3B is a block diagram schematically showing target image data IMD that represents the target image OI shown in FIG. 3A. The target image data IMD represents the five objects OB01 to OB05 included in the target image OI, and shows the respective orders of the five objects OB01 to OB05 in the combining sequence.

For instance, the target image data IMD shown in FIG. 3B contains page data representing the target image OI. For instance, the page data PD contains stream data in which a plurality of drawing operators OP01 to OP05 are arranged in a processing order. The CPU 210 interprets these drawing operators OP01 to OP05, thereby generating bitmap data representing the objects OB01 to OB05. In the following description, generating bitmap data representing an object may be expressed as "drawing an object." In the example shown in FIGS. 3A and 3B, the plurality of drawing operators OP01 to OP05 correspond to the objects OB01 to OB05. In addition, the arrangement order of the plurality of drawing operators OP01 to OP05 represents the combining sequence of the objects OB01 to OB05 composition order. Nonetheless, it is noted that a single drawing operator does not necessarily correspond to a single object. A plurality of drawing operators may correspond to a single object. A single drawing operator may correspond to a plurality of objects. Further, the combining sequence of the plurality of objects may be represented in other manners. For instance, the combining sequence may be represented by incorporation of data indicating the combining sequence into the page data PD.

The drawing operator OP04 is a group operator corresponding to the combined object OB04. The group operator OP04 is associated with stream data ST in which three drawing operators OP11 to OP13 corresponding to the plurality of objects OB11 to OB13 included in the combined object OB04 are arranged in a processing order. The CPU 210 interprets these drawing operators OP11 to OP13, thereby drawing the objects OB11 to OB13.

A drawing operator different from a group operator, i.e., a drawing operator corresponding to a stand-alone object, may be referred to as a "normal operator" (see FIG. 3B).

The page data PD further contains information representing an object and a type of the object to be processed by the aforementioned color mixing process. Specifically, the page data PD further includes a color mixing designating operator MOs and a color mixing canceling operator MOe, as status operators that designate an object to be processed by the color mixing process (e.g., the transparentizing process). In the example shown in FIG. 3B, the color mixing designating operator MOs is disposed between the two drawing operators OP03 and OP04. Further, the color mixing canceling operator MOe is disposed between two drawing operators OP04 and OP05. The color mixing process is performed when an object, which corresponds to a drawing operator sandwiched between the color mixing designating operator MOs and the color mixing canceling operator MOe, is combined with another object that has an earlier order in the combining sequence. In the example shown in FIG. 3B, the color mixing process is performed when the combined object OB04 corresponding to the drawing operator OP04 is combined with another object. The color mixing designating operator MOs includes, for instance, a type of the color mixing process or information (e.g., data indicating a transparency used in the transparentizing process) necessary for the color mixing process. The replacement process is performed when an object, which corresponds to a drawing operator that is not sandwiched between the color-mixing designating operator MOs and the color mixing canceling operator MOe, is combined with another object.

The objects included in the target image OI are grouped into a plurality of hierarchical layers. Specifically, the objects OB01 to OB05 in FIG. 4A are in a zeroth layer. The objects OB11-OB13 in FIG. 4B are in a first layer. The three objects OB11-OB13 in the first layer constitute the object OB04 in the zeroth layer that is one level lower in hierarchy than the first layer. In other words, the three objects OB11-OB13 form a group of objects corresponding to the combined object OB04.

In drawing the target image OI, the combined object OB04 is drawn by the three objects OB11 to OB13 in the first layer being drawn and combined. Subsequently, the combined object OB04 needs to be combined with an image obtained by combining the objects OB01 to OB03 in the zeroth layer. If the above combining sequence is not obeyed, the bitmap data might not be generated in such a manner as to represent the target image OI as described in the target image data IMD. In particular, it is preferable that the combining sequence is obeyed, when the color mixing process is included in at least one of combining the objects OB11 to OB13 included in the combined object OB04 and combining the combined object OB04 with the objects OB01 to OB03.

In the example shown in FIGS. 3A and 3B, the objects in the first layer, which constitute the combined object OB04 in the zeroth layer, are the stand-alone objects OB11 to OB13. At least one of the objects in the first layer may be a combined object formed by combining a plurality of objects. In this case, the plurality of objects, which constitute the combined object in the first layer, form a group of objects in a second layer. Thus, two or more hierarchical layers may be formed.

In S20 of FIG. 2, the CPU 210 performs a rasterization process using the target image data. Thereby, RGB image data representing the target image OI is generated. The RGB image data is bitmap data containing a plurality of pixel data. Each pixel data of the RGB image data represents a set of RGB values indicating a color of a corresponding pixel. Each set of RGB values includes three component values of red (R), green (G) and blue (B). The rasterization process will be described later.

In S30, the CPU 210 performs a color conversion process using the RGB image data generated in S20. Specifically, in the color conversion process, the CPU 210 converts the RGB image data into CMYK image data. The CMYK image data represents a color of each pixel by a set of CMYK values that includes color components (e.g., C, M, Y, and K components) corresponding to color materials used for printing. The color conversion process is performed, for instance, by referring to a known lookup table.

In S40, the CPU 210 preforms a halftone process using the generated CMYK image data. Specifically, in the halftone process, the CPU 210 generates dot data that represents a dot formation state for each pixel and for each type (color) of ink. The halftone process is performed using a known method such as an error diffusion method or a dither method. Each pixel value of the dot data represents at least whether there exists a dot. In addition to whether there exists a dot, each pixel value of the dot date may represent a type (e.g., a size) of the dot. Specifically, each pixel value included in the dot data may represent one of two dot formation states of "dot formed" and "no dot," or may represent one of four dot formation states of "large-sized dot," "medium-sized dot," "small-sized dot," and "no dot."

In S50, the CPU 210 generates print data using the dot data. For instance, the CPU 210 generates the print data by performing a process of sorting the dot data in such an order as applied in printing by the print engine 280 and a process of adding printer control codes and data identification codes. In S60, the CPU 210 controls the print engine 280 to print an image according to the generated print data.

A-3. Rasterization Process

Figure 5:
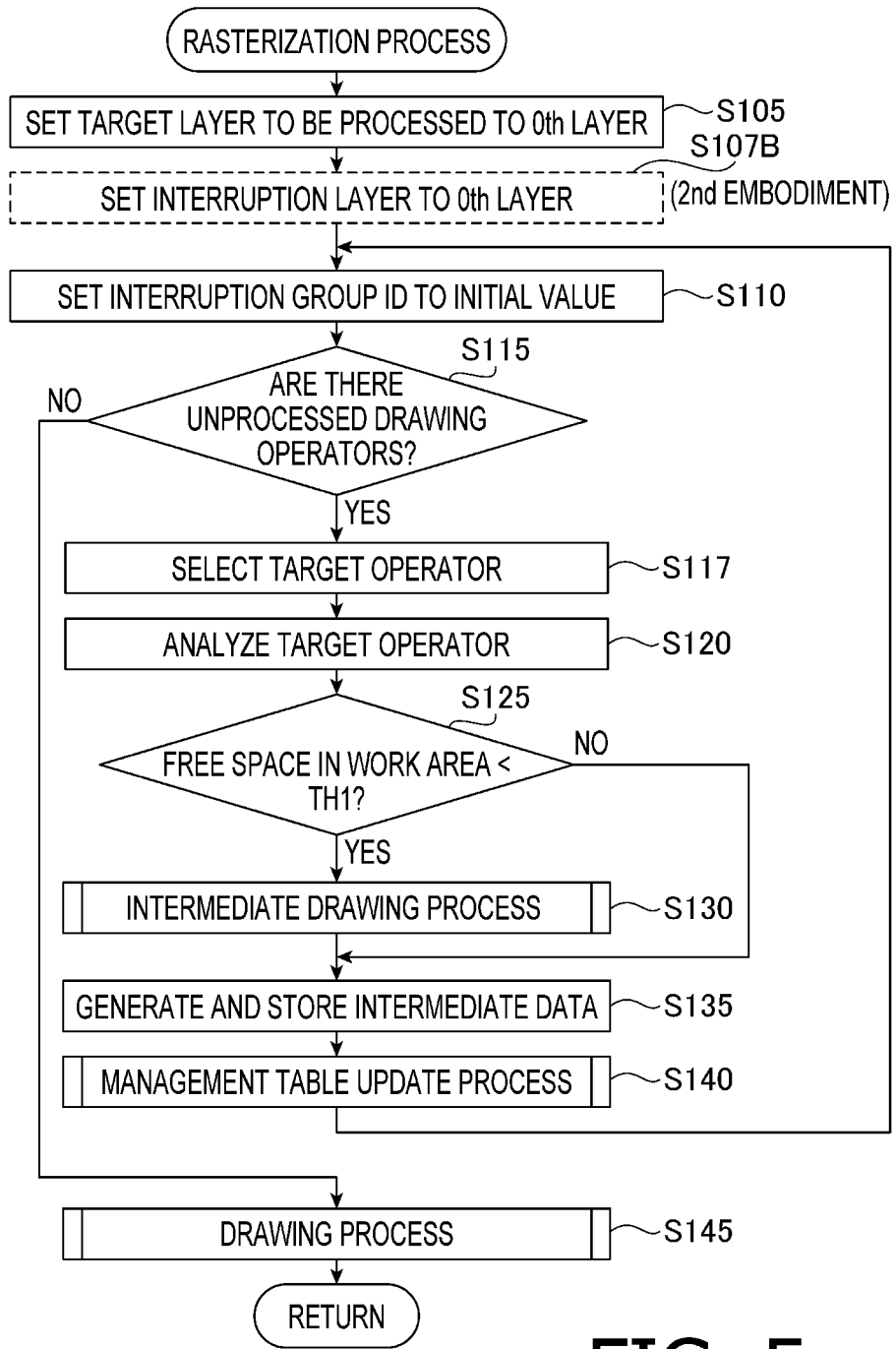
FIG. 5 is a flowchart showing a procedure of a rasterization process by the CPU of the printer in the first illustrative embodiment and a second illustrative embodiment (note: S107B is exclusively for the second illustrative embodiment) according to one or more aspects of the present disclosure.

The rasterization process of S20 in FIG. 2 will be described. FIG. 5 is a flowchart showing a procedure of the rasterization process. A process of S107B, indicated by a dashed line in FIG. 5, is performed only in a second illustrative embodiment, but is not performed in the first illustrative embodiment. Therefore, S107B will be described later in the second illustrative embodiment. The rasterization process is a process of generating RGB image data representing the target image OI based on the target image data. The rasterization process is performed using the work area 222. Namely, the CPU 210 temporarily stores, in the work area 222, data (e.g., below-mentioned intermediate data) generated during the rasterization process. A necessary capacity of the work area 222 differs depending on factors such as the complexity of the target image OI represented by the target image data. Further, a securable capacity of the work area 222 may differ depending on factors such as whether there is a process (e.g., communication with the terminal device 100 or control of the display 240) that the CPU 210 is performing in parallel with the rasterization process. Therefore, the capacity of the work area 222 may be insufficient during the rasterization process. If the capacity of the work area 222 is insufficient, it may cause adverse influences on execution of the rasterization process. The rasterization process of the first illustrative embodiment is ingeniously created to suppress the adverse influences on the rasterization process due to the insufficient capacity of the work area 222.

In S105, CPU 210 sets a target layer to be processed to an initial value, i.e., the zeroth layer. In S110, the CPU 210 sets an interruption group ID to an initial value. The interruption group ID is set to a different value from the initial value in a below-mentioned intermediate drawing process.

In S115, CPU 210 determines whether there are one or more unprocessed drawing operators among the drawing operators OP01 to OP05 and OP11 to OP13 for the target image OI that are included in the target image data IMD.

When there are one or more unprocessed drawing operators (S115: Yes), the CPU 210 selects a target operator from among the one or more unprocessed drawing operators according to a processing order (S117). The processing order is an arrangement order of the drawing operators in the page data PD. If the group operator OP04 is included in the one or more unprocessed drawing operators, at a time when a turn of the group operator OP04 in the processing order has come, the CPU 210 sequentially selects, in the arrangement order, each of the drawing operators OP11 to OP13 included in the stream data ST associated with the object OB04.

In S120, CPU 210 analyzes the target operator. By analyzing the target operator, the CPU 210 is enabled to generate intermediate data in a below-mentioned step S135.

In S125, the CPU 210 determines whether a free space in the work area 222 is less than a reference value TH1. The reference value TH1 is previously set to a value corresponding to the free space enough to store the intermediate data generated in the below-mentioned step S135.

When the free space in the work area 222 is less than the reference value TH1 (S125: Yes), the CPU 210 performs the intermediate drawing process (S130). The intermediate drawing process is a process of drawing some of the objects included in the target image OI by using at least a part of intermediate data that has been generated up to this point of time. In the intermediate drawing process, below-mentioned compressed image data is generated by compressing bitmap data representing some of the objects. Intermediate data corresponding to the objects that have already been drawn in the intermediate drawing process is unnecessary. Therefore, in the intermediate drawing process, a storage area for the unnecessary intermediate data, in the work area 222, is released. Thus, the free space in the work area 222 is made larger than before the intermediate drawing process is performed. The intermediate drawing process will be described in detail later. After completion of the intermediate drawing process, the CPU 210 goes to S135.

When the free space in the work area 222 is equal to or more than the reference value TH1 (S125: No), the CPU 210 goes to S135 without executing the intermediate drawing process of S130.

In S135, the CPU 210 generates intermediate data based on results from the analysis of the target operator (see S120). The CPU 210 stores the generated intermediate data into the work area 222.

FIGS. 6A to 6C illustrate the intermediate data and the work area 222 in the first illustrative embodiment. FIG. 6A shows a group of intermediate data to be generated to draw the target image OI shown in FIG. 3A. As shown in FIG. 6A, the group of the intermediate data to be generated includes the object data D01 to D03 and D05 corresponding to the stand-alone objects OB01 to OB03 and OB05 in the zeroth layer. Further, the group of the intermediate data includes the object data D11 to D13 corresponding to the objects OB11 to OB13 in the first layer. The whole of the object data D11-D13 is a group G1 of the object data corresponding to the combined object OB04. The object data is expressed using a language that is more primitive than the page description language used for the target image data. The primitive language may be, for instance, a language defined by a manufacturer of the printer 200.

The group of the intermediate data further includes start flag data SF1 and end flag data EF1. The start flag data SF1 indicates a start of the group G1. The end flag data EF1 indicates an end of the group G1. Each of the start flag data SF1 and the end flag data EF1 includes an ID for identifying the group G1. The ID is provided by the CPU 210 when the start flag data SF1 is generated. These pieces of intermediate data are sequentially generated and stored into the work area 222 while the drawing operators are sequentially processed in the steps S117, S120, and S135 of FIG. 5. In FIG. 6A, these pieces of intermediate data are arranged from top to bottom in a generation order. For instance, when the target operator is the drawing operator OP01 in FIG. 3B, the object data D01 is generated and stored in the work area 222 in S135. Further, when the target operator is the group operator OP04, the start flag data SF1 is generated and stored in the work area 222 in S135. Furthermore, when the target operator is the final drawing operator OP03 in the stream data ST corresponding to the group operator OP04, the object data D13 and the end flag data EF1 are generated and stored in the work area 222 in S135.

In S140, the CPU 210 performs a management table update process to update the management table MT shown in FIG. 1. The management table MT stores parameters necessary for the rasterization process. More detailed explanation of the contents of the management table MT and the management table update process will be provided later. After completion of the management table update process, the CPU 210 goes back to S110.

When all of the drawing operators have been processed (S115: No), the CPU 210 performs the drawing process (S145). The drawing process is a process of drawing the target image OI using intermediate data and compressed image data that have been generated up to this point of time. At the time of S145, all the data necessary for drawing the target image OI is stored in the work area 222. Therefore, in S145, the CPU 210 generates bitmap data (in the first illustrative embodiment, RGB image data) representing the complete target image OI. After the generation of the RGB image data representing the target image OI, the CPU 210 terminates the rasterization process.

A-4. Management Table Update Process

Figure 7:
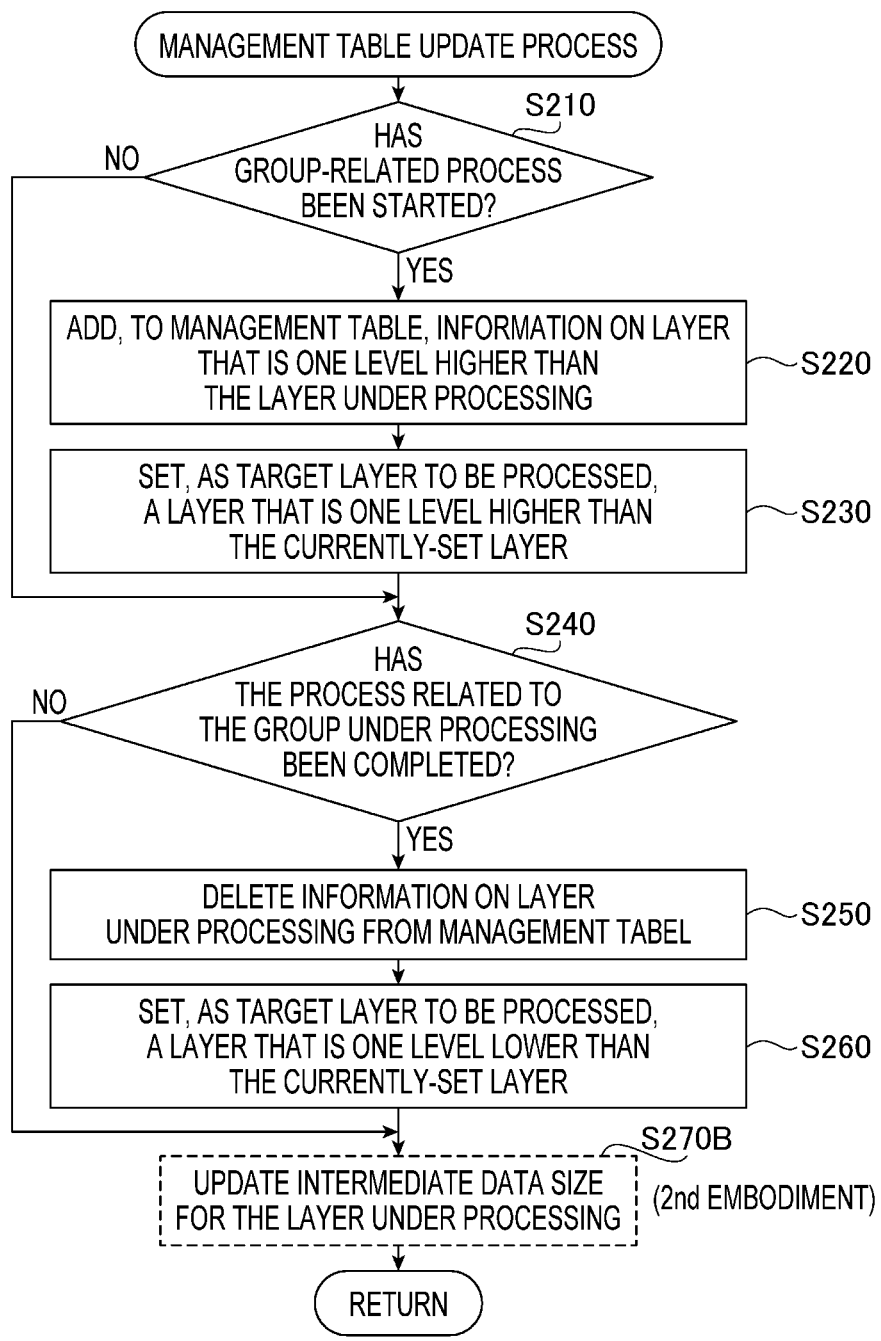
FIG. 7 is a flowchart showing a procedure of a management table update process by the CPU of the printer in the first and second illustrative embodiments (note: S270B is exclusively for the second illustrative embodiment) according to one or more aspects of the present disclosure.

The management table update process of S140 in FIG. 5 will be described. FIG. 7 is a flowchart showing a procedure of the management table update process. A process of S270B, indicated by a dashed line in FIG. 7, is performed only in the second illustrative embodiment, but is not performed in the first illustrative embodiment. Hence, S270B will be described later in the second illustrative embodiment. FIG. 1 shows an example of the management table MT. The management table MT in FIG. 1 includes a row for the zeroth layer and a row for the first layer. In the row for each layer, the ID for identifying a group (e.g., the group G1) including a plurality of objects in the corresponding layer is registered. The objects in the zeroth layer do not have an ID of the group. The management table MT in an initial state has no information registered. Information is registered in the management table MT in the management table update process.

In S210, the CPU 210 determines whether a group-related process has been started. For instance, when the current target operator selected in S117 (see FIG. 5) is the group operator OP04, the CPU 210 determines that the group-related process has been started. Meanwhile, when the current target operator is a stand-alone operator, the CPU 210 does not determine that the group-related process has been started. However, when the management table update process is performed at the beginning of the rasterization process for one page, the CPU 210 may determine that a group-related process in the zeroth layer has been started. Thus, in this case, the CPU 210 determines that the group-related process has been started.

When determining that the group-related process has been started (S210: Yes), the CPU 210 newly adds, to the management table MT, information on a layer that is one level higher in the hierarchy than the layer under processing (S220). For instance, when the target operator is the group operator OP04, the layer under processing is the zeroth layer, the CPU 210 generates a row for the first layer on the management table MT. The CPU 210 registers, in the generated row, the ID of the group G1 corresponding to the group operator OP04. In the example shown in FIG. 1, the reference character (in the example shown in FIG. 1, "G1") of the group is recorded as the ID of the group. When the management table update process is performed at the beginning of the rasterization process for one page, a row for the zeroth layer is newly added to the management table MT.

In S230, the CPU 210 sets, as a target layer to be processed, a layer that is one level higher in the hierarchy than the currently-set layer. For instance, if the target operator is the group operator OP04, the target layer to be processed is changed from the zeroth layer (i.e., the currently-set layer) to the first layer.

When determining that the group-related process has not been started (S210: No), the CPU 210 goes to S240 without executing S230.

In S240, the CPU 210 determines whether the process related to the group under processing has been completed. For instance, when the current target operator selected in S117 (see FIG. 5) is the final drawing operator OP13 included in the stream data ST, the CPU 210 determines that the process related to the group under processing has been completed (S240: Yes). Meanwhile, when the current target operator is another operator, the CPU 210 determines that the process related to the group under processing has not been completed (S240: No).

When determining that the process related to the group under processing has been completed (S240: Yes), the CPU 210 deletes the information on the layer under processing from the management table MT (S250). For instance, when the target operator is the final drawing operator OP13 included in the stream data ST, the layer under processing is the first layer. Therefore, in this case, the CPU 210 deletes the first layer from the management table MT.

In S260, the CPU 210 sets, as a target layer to be processed, a layer that is one level lower in the hierarchy than the currently-set layer. For instance, if the target operator is the final drawing operator OP13 included in the stream data ST, the target layer to be processed is changed from the first layer (i.e., the currently-set layer) to the zeroth layer.

When determining that the process related to the group under processing has not been completed (S240: No), the CPU 210 terminates the management table update process without executing S250 or S260.

A-5. Intermediate Drawing Process

Figure 8:
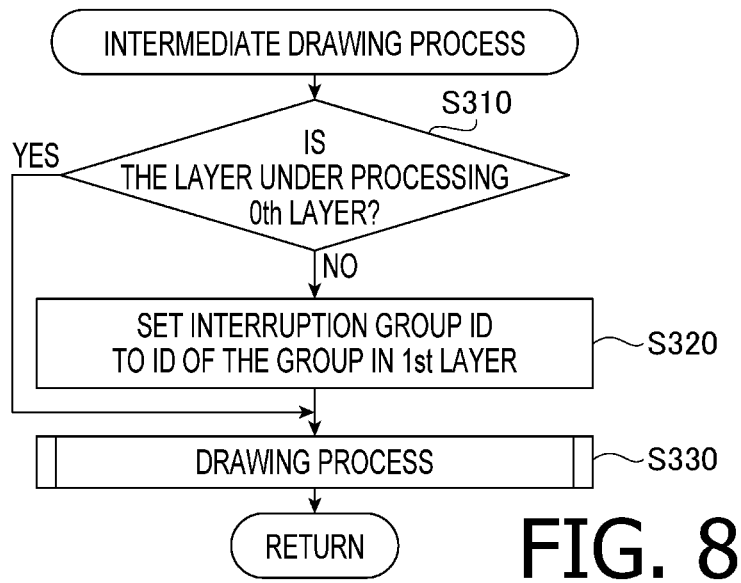
FIG. 8 is a flowchart showing a procedure of an intermediate drawing process by the CPU of the printer in the first illustrative embodiment according to one or more aspects of the present disclosure.

The intermediate drawing process of S130 in FIG. 5 will be described. FIG. 8 is a flowchart showing a procedure of the intermediate drawing process. The intermediate drawing process is a process of drawing at least a part of the objects included in the target image OI by using the intermediate data stored in the work area 222 at that point of time.

In S310, CPU 210 determines whether the currently-set layer under processing is the zeroth layer. For instance, when the current target operator selected in S117 (see FIG. 5) is one of the drawing operators OP1 to OP05 corresponding to the objects in the zeroth layer, the currently-set layer under processing is the zeroth layer at that point of time. In addition, when the current target operator is one of the drawing operators OP11 to OP13, the currently-set layer under processing is the first layer at that point of time.

When determining that the currently-set layer under processing is the first layer (S310: No), the CPU 210 sets the interruption group ID to the ID of the group in the first layer (S320). The ID of the group in the first layer is recorded on the management table MT (see FIG. 1).

When determining that the currently-set layer under processing is the zeroth layer (S310: Yes), the CPU 210 goes to S330 without executing S320.

In S330, the CPU 210 performs the below-mentioned drawing process. Thereafter, the CPU 210 terminates the intermediate drawing process. As described above, in the intermediate drawing process, compressed image data (as will be described later) is generated by compressing bitmap data representing a part of the objects included in the target image OI. Further, an area in which unnecessary intermediate data is stored, in the work area 222, is released. The free space of the work area 222 is increased by the compression of the bitmap data. Thereby, the free space of the work area 222 is made larger than before the intermediate drawing process is performed.

A-6. Drawing Process

Figure 9:
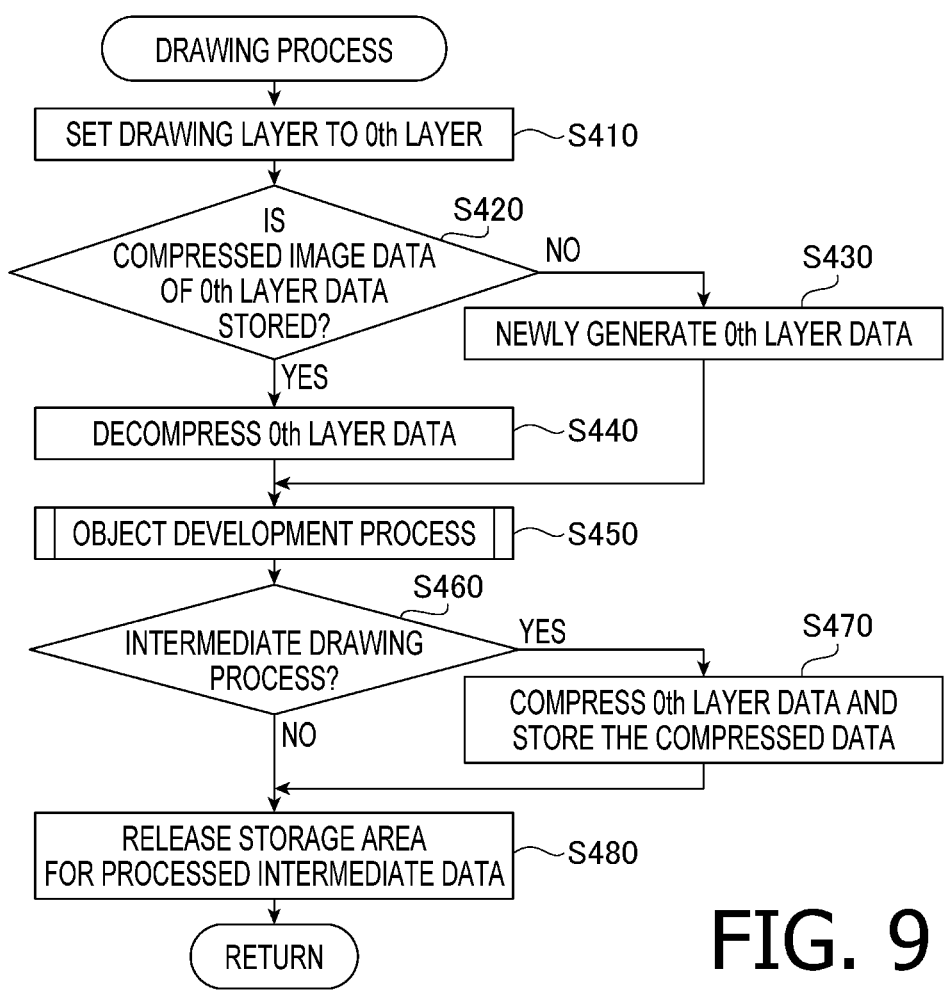
FIG. 9 is a flowchart showing a procedure of a drawing process by the CPU of the printer in the first illustrative embodiment according to one or more aspects of the present disclosure.

The drawing process to be performed in S145 of FIG. 5 and in S330 of FIG. 8 will be described. FIG. 9 is a flowchart showing a procedure of the drawing process. In S410, the CPU 210 sets a drawing layer to the zeroth layer.

In S420, the CPU 210 determines whether compressed image data of zeroth layer data is stored in the work area 222. Here, it is noted that "k-th layer data" ("k" is an integer equal to or more than zero) or "layer data in the k-th layer" denotes bitmap data for drawing objects in the k-th layer. When the intermediate drawing process has been performed prior to this point of time, the compressed image data of the zeroth layer data is stored in the work area 222.

When determining that the compressed image data of the zeroth layer data is stored in the work area 222 (S420: Yes), the CPU 210 decompresses the compressed image data of the zeroth layer data (S440). The decompressed zeroth layer data is stored into the work area 222. At the point of time when the compressed image data of the zeroth layer data is decompressed, the storage area for the compressed image data is released.

When determining that the compressed image data of the zeroth layer data is not stored in the work area 222 (S420: No), the CPU 210 newly generates zeroth layer data (S430). The generated zeroth layer data is stored not in the work area 222 but in the output data storage area 223. In the newly generated layer data, there is no image drawn. Each of all pixel values included in the newly generated layer data is an initial value (e.g., a value indicating white).

Figure 10A:
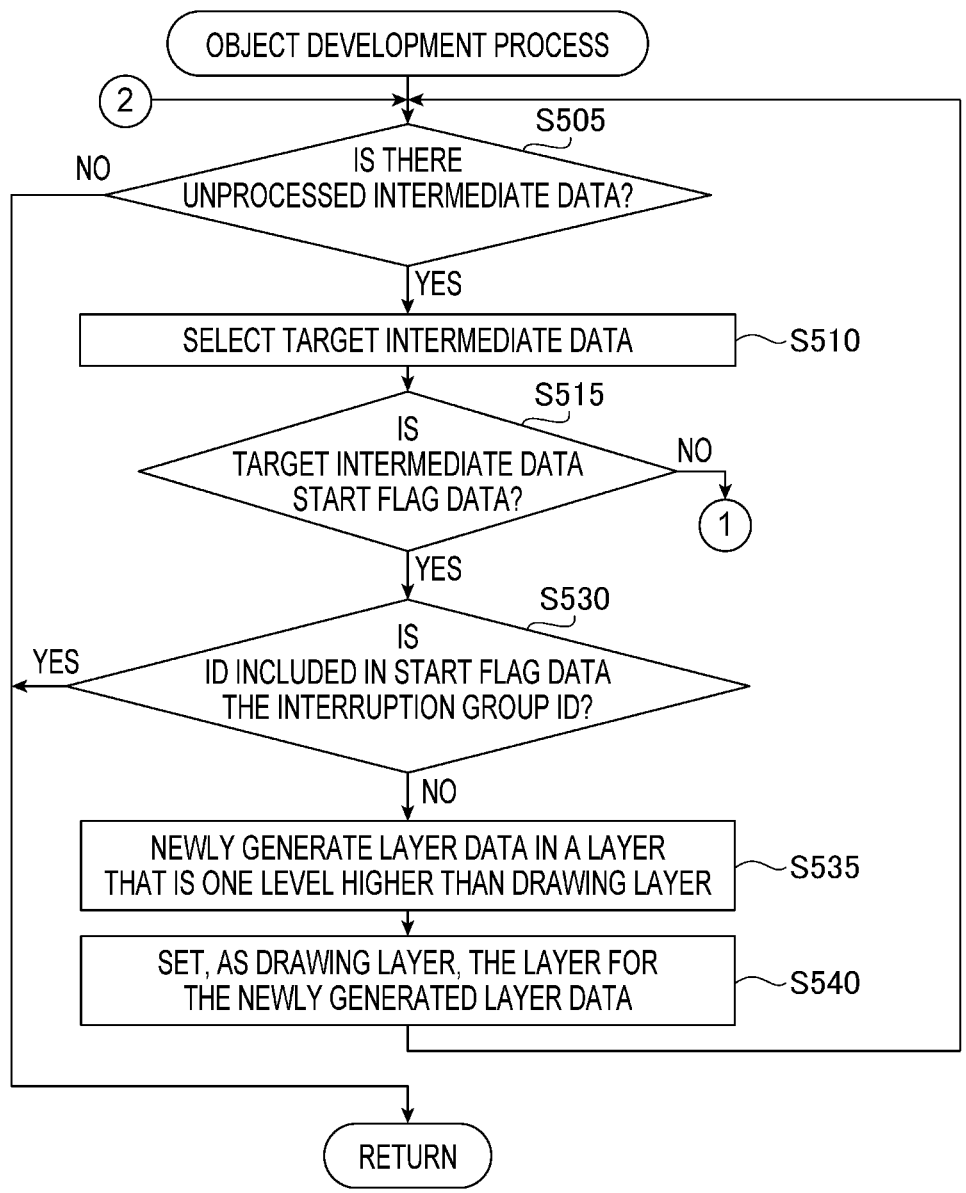
FIGS. 10A and 10B are flowcharts showing a procedure of an object development process by the CPU of the printer in the first and second illustrative embodiments (note: S550B and S555B are exclusively for the second illustrative embodiment) according to one or more aspects of the present disclosure.
Figure 10B:
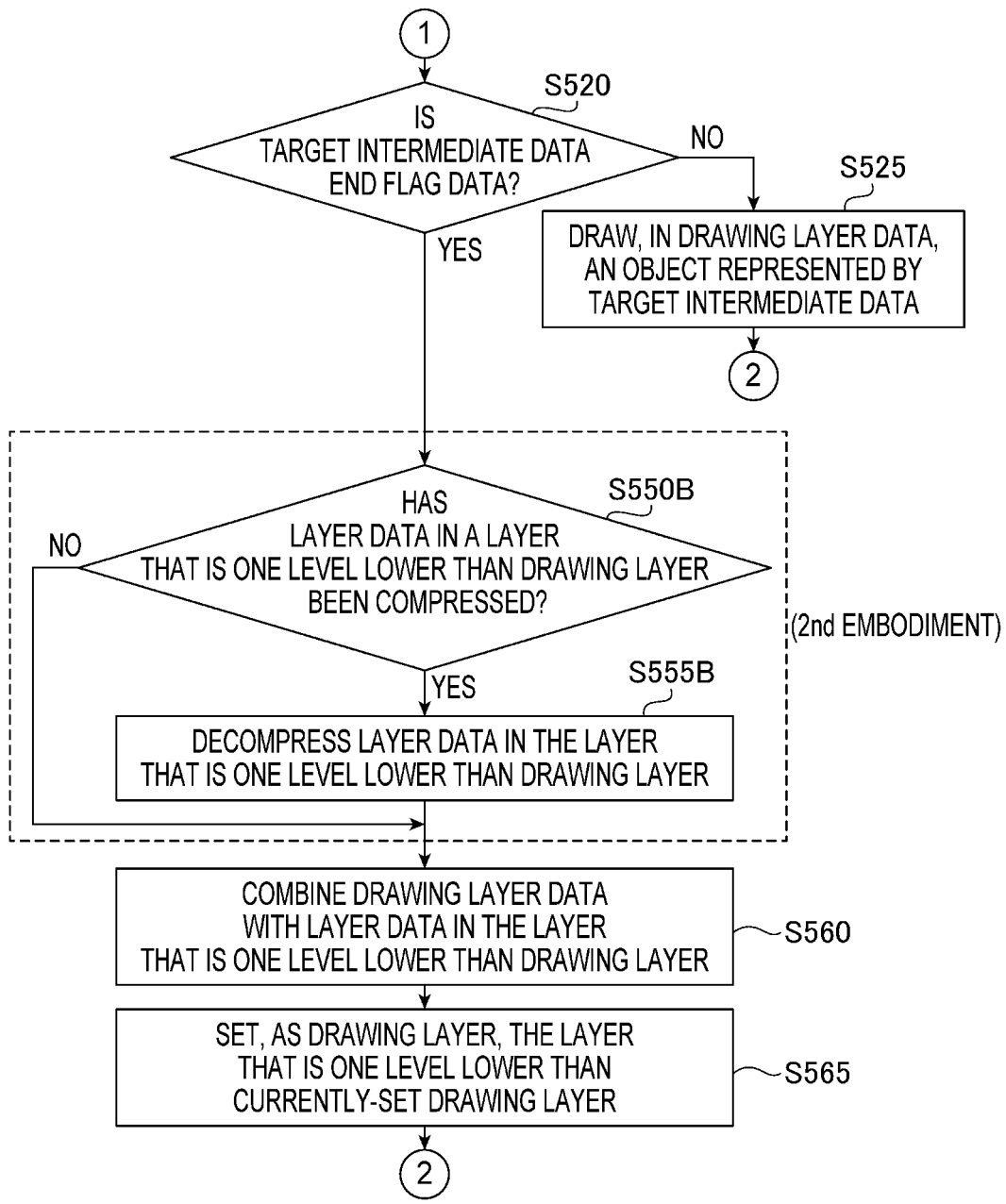

In S450, the CPU 210 performs an object development process. The object development process is a process of drawing objects in layer data (hereinafter, which may be referred to as "drawing layer data") of the drawing layer by using intermediate data stored in the work area 222. FIGS. 10A and 10B are flowcharts showing a procedure of the object development process. Processes of S550B and S555B, surrounded by a dashed line in FIG. 10B, are performed only in the second illustrative embodiment, but are not performed in the first illustrative embodiment. Therefore, S550B and S555B will be described later in the second illustrative embodiment.

In S505, the CPU 210 determines whether there is unprocessed intermediate data stored in the work area 222. For instance, FIG. 6B shows an example of a state where intermediate data is stored in the work area 222. FIG. 6B illustrates the work area 222 when the CPU 210 performs the drawing process in S145 (see FIG. 5) without executing the intermediate drawing process in S130 (see FIG. 5).

When determining that there is unprocessed intermediate data (S505: Yes), the CPU 210 selects a single piece of intermediate data as target intermediate data from among one or more pieces of intermediate data stored in the work area 222 (S510). In the work area 222, the one or more pieces of intermediate data (flag data or object data) are stored in the generation order. The generation order (i.e., a storage order) of the one or more pieces of intermediate data is identical to a processing order in which the one or more pieces of intermediate data are to be sequentially processed. Therefore, the CPU 210 selects, in the storage order, the target intermediate data from among the one or more pieces of intermediate data stored in the work area 222. When all the intermediate data has been processed (S505: No), the CPU 210 terminates the drawing process.

In S515, the CPU 210 determines whether the target intermediate data is start flag data (e.g., SF1 in FIG. 6B). When determining that the target intermediate data is the start flag data (S515: Yes), the CPU 210 goes to S530.

In S530, the CPU 210 determines whether an ID included in the start flag data is the interruption group ID. When the drawing process in execution is the drawing process of S330 in the intermediate drawing process (see FIG. 8), and the process of S320 (see FIG. 8) is being performed, the interruption group ID is set to the ID of the group in the first layer. When the drawing process in execution is the drawing process of S330 in the intermediate drawing process (see FIG. 8), and the process of S320 (see FIG. 8) is not being performed, or when the drawing process in execution is the drawing process of S145 in the rasterization process (see FIG. 5), the interruption group ID is set to an initial value. When the interruption group ID is the initial value, it is determined that the ID included in the start flag data is not the interruption group ID. When the interruption group ID is the ID of the group in the first layer, the ID included in the start flag data may be identical to the interruption group ID.

When determining that the ID included in the start flag data is the interruption group ID (S530: Yes), the CPU 210 terminates the object development process. When determining that the ID included in the start flag data is not the interruption group ID (S530: No), the CPU 210 newly generates layer data in a layer that is one level higher in the hierarchy than the drawing layer (S535). Layer data in layers hierarchically higher than the first layer is stored in the work area 222. For instance, when the target intermediate data is the start flag data SF1 in FIG. 6B, the first layer data is newly generated. In S540, CPU 210 sets, as a drawing layer, the layer for the newly generated layer data. After S540, CPU 210 goes back to S505.

When determining that the target intermediate data is not the start flag data (S515: No), the CPU 210 determines whether the target intermediate data is end flag data (e.g., EF1 in FIG. 6B) (S520). When determining that the target intermediate data is not the end flag data (S520: No), the target intermediate data is object data. In this case, the CPU 210 goes to S525.

In S525, using the target intermediate data (object data), the CPU 210 draws, in the drawing layer data, an object (which may be referred to as a "target object") represented by the target intermediate data. When there is an object that is in the same layer as for the target object and has an earlier order than the target object in the combining sequence, the object is drawn in the drawing layer data at that point of time. Thus, in this case, the target object is combined with the drawn object in the drawing layer data. In other words, in S525, the CPU 210 performs a combining process to combine the target object with the drawn object. After S525, the CPU 210 goes back to S505.

When determining that the target intermediate data is end flag data (S520: Yes), the CPU 210 combines the drawing layer data with layer data in the layer that is one level lower in the hierarchy than the drawing layer (S560). At this point of time, it has been completed to draw the combined object that includes the plurality of objects of the group in the drawing layer. Therefore, in S560, the complete combined object is combined with layer data in the layer that is one level lower in the hierarchy than the drawing layer. For instance, when the target intermediate data is the end flag data EF1, a combining process is performed to combine the combined object OB04 corresponding to the object data D11 to D13 of the group G1 with the objects OB01 to OB03 that have earlier orders than the combined object OB04 in the combining sequence.

In S565, the CPU 210 sets, as a drawing layer, the layer that is one level lower in the hierarchy than the currently-set drawing layer. For instance, when the target intermediate data is the end flag data EF1 in FIG. 6B, since the currently-set drawing layer is the first layer, the drawing layer is changed from the first layer to the zeroth layer. After S565, the CPU 210 goes back to S505.

As described above, the object development process is terminated at a point of time when all the intermediate data stored in the work area 222 is processed, or intermediate data immediately before intermediate data for a group identified by an interruption group ID is processed.

After completion of the object development process, the CPU 210 determines whether the intermediate drawing process is currently in progress (S460 in FIG. 9). When a drawing process in execution is the drawing process in S330 of the intermediate drawing process (see FIG. 8), the CPU 210 determines that the intermediate drawing process is currently in progress (S460: Yes). When the drawing process in execution is the final drawing process in S145 of the rasterization process (see FIG. 5), the CPU 210 determines that the intermediate drawing process is not currently in progress (S460: No).

When the intermediate drawing process is in progress (S460: Yes), the zeroth layer data in which the drawing has not been completed is stored in the output data storage area 223. In this case, in S470, the CPU 210 compresses the zeroth layer data to generate compressed image data of the zeroth layer data, and stores the generated compressed image data into the work area 222. A storage area for the uncompressed zeroth layer data is released at the point of time when the zeroth layer data has been compressed. Examples of a method to compress layer data may include, but are not limited to, reversible compressive coding algorithms such as run-length coding and Huffman coding. By applying a reversible compressive coding algorithm to compress layer data, it is possible to finally generate substantially the same zeroth layer data (i.e., RGB image data) as when the intermediate drawing process is not performed, even when the intermediate drawing process is performed.

When the intermediate drawing process is not in progress, i.e., when the final drawing process is in progress (S460: No), the layer data in which the drawing has been completed is stored in the output data storage area 223. In this case, the CPU 210 goes to S480 without executing S470.

In S480, the CPU 210 releases a storage area for intermediate data that has been processed in the object development process of S450. The processed intermediate data is intermediate data that is no longer needed since the corresponding objects are drawn in the layer data. Thereby, the free space in the work area 222 is increased. After completion of S480, the CPU 210 terminates the drawing process.

A-7. Specific Example of Rasterization Process

A specific example of the aforementioned rasterization process in the first illustrative embodiment will be described with reference to FIGS. 6A to 6C. When the free space in the work area 222 is large enough, it is never determined in S125 (see FIG. 5) that the free space in the work area 222 is less than the reference value TH1. Therefore, in such a case, the intermediate drawing process of S130 is not performed. In this case, a process of analyzing a drawing operator, generating intermediate data, and storing the generated intermediate data into the work area 222 (S120 and S135 in FIG. 5) is repeatedly performed without being interrupted. Consequently, at the point of time when the CPU 210 proceeds to S145 after processing all the drawing operators (S115: No), as shown in FIG. 6B, all pieces of the intermediate data to be generated (see FIG. 6A) are stored in the work area 222. It is noted that each of the hatched areas in FIGS. 6B and 6C represents the free space in the work area 222. In this case, in the drawing process of S145, zeroth layer data (i.e., bitmap data for drawing objects in the zeroth layer) is newly generated (S430 in FIG. 9), and the zeroth layer data is completed (S450 in FIG. 9). Then, all pieces of the intermediate data in the work area 222 are processed, and the storage areas therefor are released (S480 in FIG. 9).

Next, an explanation will be provided of when the capacity of the work area 222 is not sufficient in the rasterization process. As shown on the left side of FIG. 6C, suppose for instance that it is determined that the free space in the work area 222 is less than the reference value TH1 (S125: Yes, in FIG. 5), at a point of time when up to the object data D12 which is the second object data in the group G1 has been generated and stored into the work area 222 among all pieces of the intermediate data to be generated (see FIG. 6A). At this point of time, in this case, the process of generating intermediate data and storing the generated intermediate data in the work area 222 (S120 and S135 in FIG. 5) is interrupted, and the intermediate drawing process of S130 is performed. In this case, at the point of time when the intermediate drawing process is started, the layer under processing is the first layer (S310: No, in FIG. 8). Therefore, the interruption group ID is set to the group ID "G1" of the first layer (S320 in FIG. 8). Then, in the drawing process (see FIGS. 9 and 10) of S330 in the intermediate drawing process (see FIG. 8), the three pieces of object data D01 to D03 in the zeroth layer, among the intermediate data stored in the work area 222, are processed, and the three objects OB01 to OB03 are drawn in the zeroth layer data (S525 in FIG. 10B). Afterward, compressed image CD0 of the uncompleted zeroth layer data in which the three objects OB01 to OB03 are drawn is generated and stored into the work area 222 (S470 in FIG. 9). The storage area for the three pieces of object data D01 to D03 in the zeroth layer, among the processed intermediate data, is released (S480 in FIG. 9). As a result, at the end of the intermediate drawing process, the work area 222 is in a state as shown in the center of FIG. 6C. In this state, the free space in the work area 222 is larger than in the state shown on the left side of FIG. 6C.

When the intermediate drawing process of S130 in FIG. 5 is completed, the process of generating intermediate data and storing the generated intermediate data in the work area 222 (S120 and S135 in FIG. 5) is resumed. Then, all the drawing operators are processed, and all pieces of the intermediate data to be generated are generated. When all the drawing operators have been processed (S115: No, in FIG. 5), the final drawing process of S145 in FIG. 5 is performed. At this point of time, the work area 222 is in a state as shown on the right side of FIG. 6C. Thus, in this state, all pieces of the intermediate data to be generated are generated and stored in the work area 222 without running out of free space in the work area 222. Thereafter, in the drawing process of S145, the compressed image data CD0 is decompressed, and the uncompleted zeroth layer data in which the three objects OB01 to OB03 are drawn is stored into the output data storage area 223 (S440 in FIG. 9). Then, in the object development process of S450, the three pieces of object data D11 to D13 in the group G1 are processed, and the combined object OB04 is drawn in the first layer data (S535, S540, and S525 in FIGS. 10A and 10B). The first layer data in which the object OB04 is drawn is combined with the uncompleted zeroth layer data, and the zeroth layer data is completed.

The completed zeroth layer data is RGB image data representing the target image OI. The generated RGB image data is completely identical regardless of whether the work area 222 is large enough. If the intermediate drawing process is not performed, when the work area 222 is not large enough, it is impossible to generate and store in the work area 222 all pieces of the intermediate data to be generated. Consequently, in such a case, when the work area 222 is not large enough, the CPU 210 of the printer 200 may be forced to perform a process that requires less memory capacity, e.g., by stopping the generation of the RGB image data, reducing the resolution, or not performing the color mixing process. In the first illustrative embodiment, it is possible to suppress such an inconvenience.

According to the first illustrative embodiment described above, the CPU 210 obtains the target image data IMD representing the target image OI (S10 in FIG. 2). For instance, the target image OI is an image obtained by combining the five objects OB01 to OB05 in the zeroth layer in a specified combining sequence. The five objects OB01 to OB05 in the zeroth layer include the combined object OB04 obtained by combining the three objects OB11 to OB13 the first layer in a specified combining sequence.

The CPU 210 performs the rasterization process (see S20 in FIG. 2, and FIG. 5) to generate the RGB image data representing the target image OI based on the target image data IMD, using the work area 222. The CPU 210 determines whether the free space in the work area 222 is less than the reference value TH1 (S125 in FIG. 5).

The rasterization process of the first illustrative embodiment may include the following first to fifth processes.

The first process includes analyzing the target image data IMD (S120 in FIG. 5 to be performed when the target operator is one of the drawing operators OP01 to OP03). The first process further includes generating the three pieces of object data D01 to D03 in the zeroth layer, which represent the three objects OB01 to OB03 in the zeroth layer that have the respective earlier orders than the combined object OB04 in the combining sequence among the five objects in the zeroth layer (S135 in FIG. 5 to be performed when the target operator is one of the drawing operators OP01 to OP03). The first process further includes storing into the work area 222 the generated three pieces of object data D01 to D03 in the zeroth layer (S135 in FIG. 5 to be performed when the target operator is one of the drawing operators OP01 to OP03).

The second process includes analyzing the target image data IMD after completion of the first process (S120 in FIG. 5 to be performed when the target operator is one of the drawing operators OP11 to OP13). The second process further includes generating the three pieces of object data D11 to D13 in the first layer that represent the three objects OB11 to OB13 in the first layer, respectively (S135 in FIG. 5 to be performed when the target operator is one of the drawing operators OP11 to OP13). The second process further includes storing into the work area 222 the generated three pieces of object data D11 to D13 in the first layer (S135 in FIG. 5 to be performed when the target operator is one of the drawing operators OP11 to OP13).

The third process includes using the three pieces of object data D01 to D03 in the zeroth layer, thereby generating the zeroth layer data that is bitmap data representing the image obtained by combining the three objects OB01 to OB03 in the zeroth layer (S525 in FIG. 10B to be performed when the target intermediate data is one of the object data D01 to D03).

The fourth process includes using the three pieces of object data D11 to D13 in the first layer, thereby generating the first layer data that is bitmap data representing the image (i.e., the combined object OB04) obtained by combining the three objects OB11 to OB13 in the first layer (S525 in FIG. 10B to be performed when the target intermediate data is one of the object data D11 to D13).

The fifth process includes using the zeroth layer data generated in the third process and the first layer data generated in the fourth process, thereby generating the RGB image data (S560 in FIG. 10B to be performed when the target intermediate data is the end flag data EF1, and S525 in FIG. 10B to be performed when the target intermediate data is the object OB05).

In a first case where it is determined that the free space in the work area 222 is less than the reference value TH1 during the second process (S125: Yes, in FIG. 5), the CPU 210 performs the process described with reference to FIG. 6C. Namely, the CPU 210 interrupts the second process and performs the third process (i.e., the third process to be performed in the intermediate drawing process of S130 in FIG. 5). After completion of the third process, the CPU 210 releases the storage area for the three pieces of object data D01 to D03 in the zeroth layer, in the work area 222 (S480 in FIG. 9). After the storage area for the three pieces of object data D01 to D03 in the zeroth layer is released, the CPU 210 completes the second process.

In a second case where it is not determined that the free space in the work area 222 is less than the reference value TH1 during the second process (S125: Always No, in FIG. 5), the CPU 210 performs the process described with reference to FIG. 6B. Namely, the CPU 210 performs the third process after completion of the second process.

Thus, according to the first illustrative embodiment, in the first case, the second process is interrupted, and the three objects OB01 to OB03 are drawn in the zeroth layer data by using the three pieces of object data D01 to D03 in the zeroth layer. Then, the second process is completed after the unnecessary storage area for the three pieces of object data D01 to D03 in the zeroth layer has been released. Consequently, it is possible to suppress adverse influences on the rasterization process due to insufficient capacity of the work area 222 during the second process. Thus, for instance, it is possible to reduce the capacity of the volatile memory 220 to be incorporated in the printer 200. In another instance, it is possible to convert more complex target image data into RGB image data in a predetermined capacity of free space.

Further, according to the first illustrative embodiment, in the first case, the CPU 210 performs a compression process to compress the uncompleted zeroth layer data generated in the third process and store the compressed zeroth layer data (i.e., the compressed image data CD0) into the work area 222 (see S470 in FIG. 9, and FIG. 6C). The CPU 210 completes the second process after the compression process, and decompresses the compressed image data CD0 after the completion of the second process (S420: Yes, and S440 in FIG. 9). The CPU 210 performs the fifth process using the decompressed zeroth layer data, thereby generating the RGB image data (S450 in FIG. 9).

Thus, when it is determined that the free space in the work area 222 is less than the reference value TH1 during the second process, the compressed image data CD0 is stored into the work area 222. Hence, it is possible to secure a sufficient free space for completing the second process in the work area 222, and to hold the uncompleted zeroth layer data in the work area 222.

Furthermore, in the first illustrative embodiment, a reversible compressive coding algorithm may be used to compress the uncompleted zeroth layer data. Thereby, even when the free space in the work area 222 is less than the reference value TH1 during the second process, it is possible to prevent deterioration of the image represented by the generated RGB image data.

Further, in the intermediate drawing process of the first illustrative embodiment, in the first case, after completion of the third process, the CPU 210 releases the storage area for the three pieces of object data D01 to D03 in the zeroth layer, without releasing the storage area for the two pieces of object data D11 and D12 in the first layer that have been stored at the time of the interruption of the second process, in the work area 222 (see FIG. 6C). As a result, unlike a below-mentioned second illustrative embodiment, the compressed image data generated in the first illustrative embodiment is only the compressed image data CD0 of the zeroth layer data. Therefore, it is possible to prevent a processing time required for compression and decompression from being excessively long, and to secure a sufficient free space in the work area 222.

B. Second Illustrative Embodiment

B-1. Examples of Intermediate Data

FIGS. 11A to 11C are illustrations of intermediate data and a work area 222 in the second illustrative embodiment. FIG. 11A shows a group of a plurality of pieces of intermediate data to be generated. In the second illustrative embodiment, an explanation will be provided of an example in which target image data is used that represents a target image with a more complex multi-layered structure than the target image data IMD in the aforementioned first illustrative embodiment. Specifically, the intermediate data group shown in FIG. 11A includes stand-alone object data D01 to D03 and D05 as object data in a zeroth layer, and a group G1 including a plurality of pieces of object data in a first layer. The group G1 includes stand-alone object data D11, D12, and D14 as object data in the first layer, and a group G2 including a plurality of pieces of object data in a second layer. The group G2 includes stand-alone object data D21, D22, and D24 as object data in the second layer, and a group G3 including a plurality of pieces of object data in a third layer. The group G3 includes stand-alone object data D31 and D32 in the third layer. The group G1 is sandwiched between start flag data SF1 and end flag data EF1. The group G2 is sandwiched between start flag data SF2 and end flag data EF2. The group G3 is sandwiched between start flag data SF3 and end flag data EF3.

The stand-alone object data D01 to D03 and D05 represent stand-alone objects OB01 to OB03 and OB05 in the zeroth layer, respectively. The group G1 represents a combined object OB04 (not shown) in the zeroth layer. The stand-alone object data D11, D12, and D14 represent stand-alone objects OB11, OB12, and OB14 in the first layer, respectively. The group G2 represents a combined object OB13 (not shown) in the first layer. The stand-alone object data D21, D22, and D24 represent stand-alone objects OB21, OB22, and OB24 in the second layer, respectively. The group G3 represents a combined object OB23 (not shown) in the second layer. The stand-alone object data D31 and D32 represent stand-alone objects OB31 and OB32 in the third layer, respectively.

As understood from the above description, the target image (not shown) in the second illustrative embodiment is an image obtained by combining the stand-alone objects OB01 to OB03 and OB05 in the zeroth layer with the combined object OB04 in the zeroth layer. The combined object OB04 is an image obtained by combining the stand-alone objects OB11, OB12, and OB14 in the first layer with the combined object OB13 in the first layer. The combined object OB13 in the first layer is an image obtained by combining the stand-alone objects OB21, OB22, and OB24 in the second layer with the combined object OB23 in the second layer. The combined object OB23 in the second layer is an image obtained by combining the stand-alone objects OB31 and OB32 in the third layer. At least one of combining objects within each layer and combining objects between different layers includes a color-mixing process.

B-2. Rasterization Process

A rasterization process of the second illustrative embodiment is different from the rasterization process of the first illustrative embodiment. The other configurations in the second illustrative embodiment are substantially the same as in the first illustrative embodiment.

In the rasterization process of the second illustrative embodiment, as indicated by a dashed line in FIG. 5, in S107B between S105 and S110, the CPU 210 sets an interruption layer to the zeroth layer. The zeroth layer is an initial value of the interruption layer. The interruption layer is a parameter for storing, when the intermediate drawing process is performed in S130, the drawing layer in which the drawing process has been interrupted during the said intermediate drawing process.

In the rasterization process of the second illustrative embodiment, a management table MT2 is used. The management table MT2 is different from the management table MT used in the first illustrative embodiment. FIG. 12 shows an example of the management table MT2. As shown in FIG. 12, the management table MT2 includes rows corresponding to the zeroth to third layers. In a row for each layer, a plurality of types of information may be registered such as a group ID, layer coordinate information, a pixel size, an area size, a compression size, a total compression size, an intermediate data size, a releasable size, and an increase in free space.

The group ID is an ID of a group (e.g., the group G1, G2, or G3) including a plurality of objects in a corresponding layer. The layer coordinate information includes coordinates Xr and Yt of an upper right vertex and coordinates X1 and Yb of a lower left vertex of an image represented by corresponding layer data (i.e., bitmap data in the corresponding layer). The pixel size is a data amount (expressed with a unit such as "bytes" or "bits") per pixel of the corresponding layer data. The area size is a total number of pixels of the corresponding layer data. The compression size is an estimated data amount of compressed image data obtained by compressing the corresponding layer data. The compression size is a value obtained by multiplying, by a particular coefficient, the pixel size multiplied by the area size.

The total compression size is the sum of the compression sizes of layers that are hierarchically equal to or lower than the corresponding layer. For instance, the total compression size of the second layer is the sum of the compression size of the zeroth layer, the compression size of the first layer, and the compression size of the second layer. The intermediate data size is a total size of intermediate data used for drawing the corresponding layer data among the generated intermediate data. For instance, the intermediate data size of the zeroth layer is a total size of intermediate data that has been generated among all pieces of the intermediate data shown in FIG. 11A. The intermediate data size of the first layer is a total size of intermediate data that has been generated among all pieces of the intermediate data included in the group G1 shown in FIG. 11A.

The releasable size is an amount by which the capacity of the work area 222 increases when a storage area, for intermediate data in layers that are hierarchically equal to or lower than the corresponding layer among the generated intermediate data, is released. The releasable size is a value obtained by adding the releasable size of a layer that is one level lower in the hierarchy than the corresponding layer to a value obtained by subtracting, from the intermediate data size of the corresponding layer, the intermediate data size of a layer that is one level higher in the hierarchy than the corresponding layer. When there is not a layer (hereinafter referred to as a "higher adjacent layer") that is one level higher in the hierarchy than the corresponding layer, the releasable size is calculated based on an assumption that the intermediate data size of the higher adjacent layer is zero. When there is not a layer (hereinafter referred to as a "lower adjacent layer") that is one level lower in the hierarchy than the corresponding layer, the releasable size is calculated based on an assumption that the releasable size of the lower adjacent layer is zero. For instance, the releasable size of the zeroth layer is a value obtained by subtracting the intermediate data size of the first layer from the intermediate data size of the zeroth layer. The releasable size of the second layer is a value obtained by adding the releasable size of the first layer to a value obtained by subtracting the intermediate data size of the third layer from the intermediate size of the second layer.

The increase in free space is an amount by which the free space in the work area 222 increases when a storage area, for intermediate data in layers that are hierarchically equal to or lower than the corresponding layer, is released in the intermediate drawing process. The increase in free space is a value obtained by subtracting the total compression size of the corresponding layer from the releasable size of the corresponding layer. When the increase in free space is a positive value, the free space in the work area 222 is increased by the intermediate drawing process.

In the second illustrative embodiment, the management table update process of S140 in FIG. 5 is different from that in the first illustrative embodiment. In the management table update process of the second illustrative embodiment, in S220 (see FIG. 7), to newly add information of a particular layer to the management table MT2, the CPU 210 registers the group ID, the layer coordinate information, the pixel size, the area size, the compression size, and the total compression size, among the aforementioned items, in the row for the particular layer on the management table MT2. These items may be specified by analyzing drawing operators in the particular layer at a point of time when processing for the drawing operators in the particular layer is started.

Further, in the management table update process of the second illustrative embodiment, the CPU 210 goes to S270B indicated by the dashed line in FIG. 7, after completion of S260 or after determining the process related to the group under processing has not been completed (S240: No). In S270B, the CPU 210 updates the intermediate data size in the row for the layer under processing, on the management table MT2. Specifically, the CPU 210 calculates a size of the intermediate data that has been generated and stored in S135 (see FIG. 5) immediately before the management table update process in S140. The CPU 210 updates the management table MT2 by adding the calculated size to the intermediate data size that has been registered on the management table MT2 until the update.

The other steps than S270B in the management table update process of the second illustrative embodiment are substantially the same as in the first illustrative embodiment.

Figure 13:
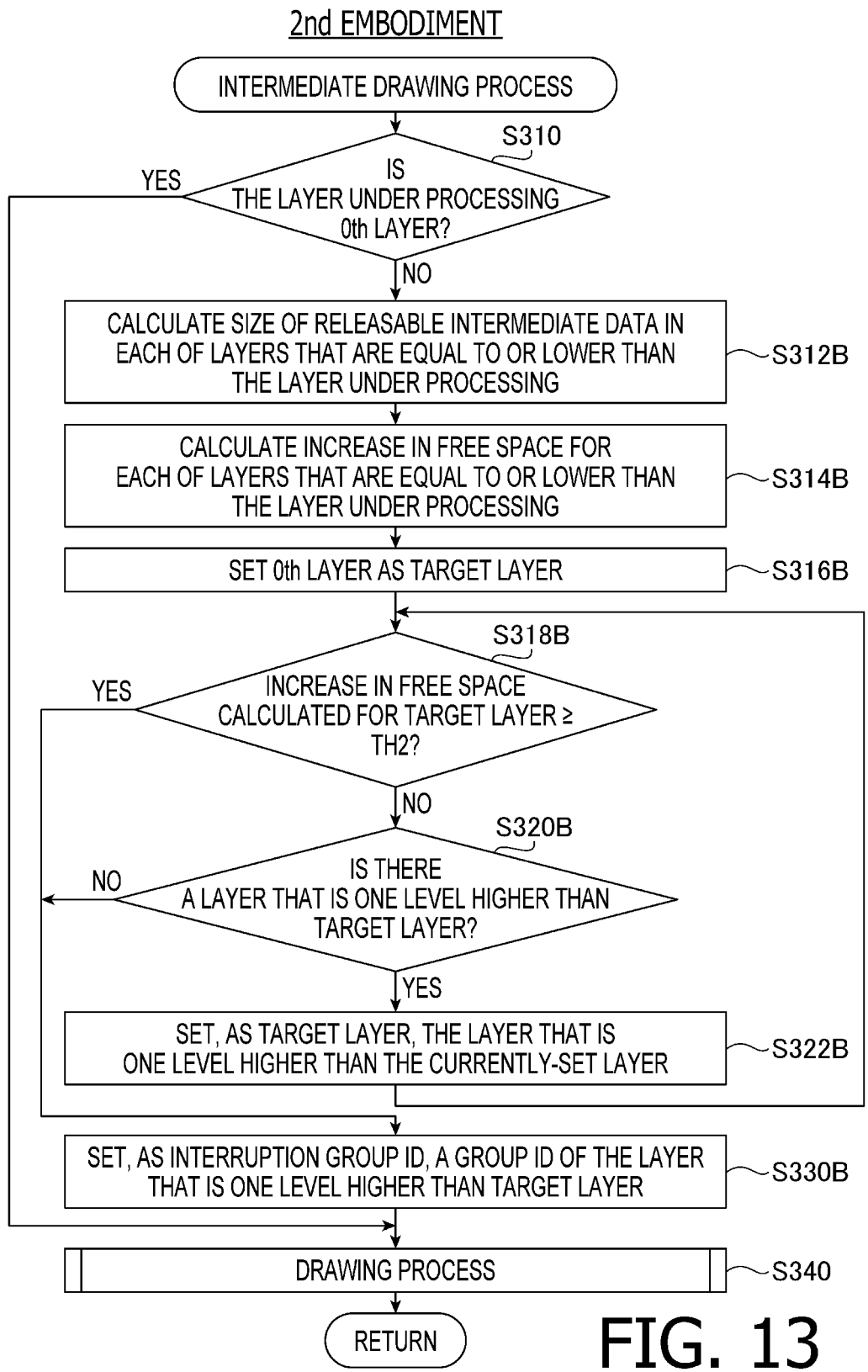
FIG. 13 is a flowchart showing a procedure of an intermediate drawing process by the CPU of the printer in the second illustrative embodiment according to one or more aspects of the present disclosure.

In the rasterization process of the second illustrative embodiment, the intermediate drawing process of S130 in FIG. 5 is different from that in the first illustrative embodiment. FIG. 13 is a flowchart showing a procedure of the intermediate drawing process in the second illustrative embodiment. In the intermediate drawing process shown in FIG. 13, the CPU 210 performs a process of S312B to S330B, instead of S320 in the intermediate drawing process shown in FIG. 8.

When determining in S310 that the layer under processing is not the zeroth layer (S310: No), the CPU 210 goes to S312B. In S312B, the CPU 210 calculates the aforementioned releasable size (i.e., the size of intermediate data releasable by the intermediate drawing process) for each of layers that are hierarchically equal to or lower than the layer under processing. Each of the calculated releasable sizes is registered in the row for the corresponding layer on the management table MT2.

In S314B, with respect to each of the layers that are hierarchically equal to or lower than the layer under processing, the CPU 210 calculates the increase in free space, i.e., an amount by which the free space in the work area 222 increases when a storage area, for intermediate data in layers that are hierarchically equal to or lower than the corresponding layer, is released in the intermediate drawing process. Each of the calculated increases in free space is registered in the row for the corresponding layer on the management table MT2.

In S316B, CPU 210 sets the zeroth layer as a target layer. In S318B, CPU 210 determines whether the increase in free space calculated for the target layer is equal to or more than a reference value TH2. For instance, the reference value TH2 may be previously determined to be an average memory capacity required for generating and storing a particular number of pieces of intermediate data.

When determining that the increase in free space calculated for the target layer is less than the reference value TH2 (S318B: No), the CPU 210 determines whether there is a layer that is one level higher than the target layer in the hierarchy (S320B). For instance, when there is a record in a row that is one row higher than the row for the target layer on the management table MT2, the CPU 210 may determine that there is a layer that is one level higher than the target layer in the hierarchy (S320B: Yes).

When determining that there is a layer that is one level higher than the target layer in the hierarchy (S320B: Yes), the CPU 210 sets, as a target layer, the layer that is one level higher than the currently-set layer in the hierarchy (S322B). Thereafter, the CPU 210 goes back to S318B.

When determining that the increase in free space calculated for the target layer is equal to or more than the reference value TH2 (S318B: Yes), or when determining that the increase in free space calculated for the target layer is less than the reference value TH2 (S318B: No) and that there is not a layer that is one level higher than the target layer in the hierarchy (S320B: No), the CPU 210 goes to S330B. In S330B, the CPU 210 sets, as the interruption group ID, a group ID of the layer that is one level higher than the target layer in the hierarchy. The group ID of each layer is registered on the management table MT2. When the currently-set target layer is a hierarchically highest layer among the layers registered on the management table MT2, the CPU 210 sets, as the interruption group ID, a predetermined ID representing a layer higher than the highest layer.

When the interruption group ID is set to the group ID of the layer that is one level higher than the currently-set target layer in the hierarchy, it means that it is determined to draw objects using intermediate data in layers that are equal to or lower than the target layer and release a storage area for the intermediate data in the layers that are equal to or lower than the target layer in the intermediate drawing process.

Figure 14:
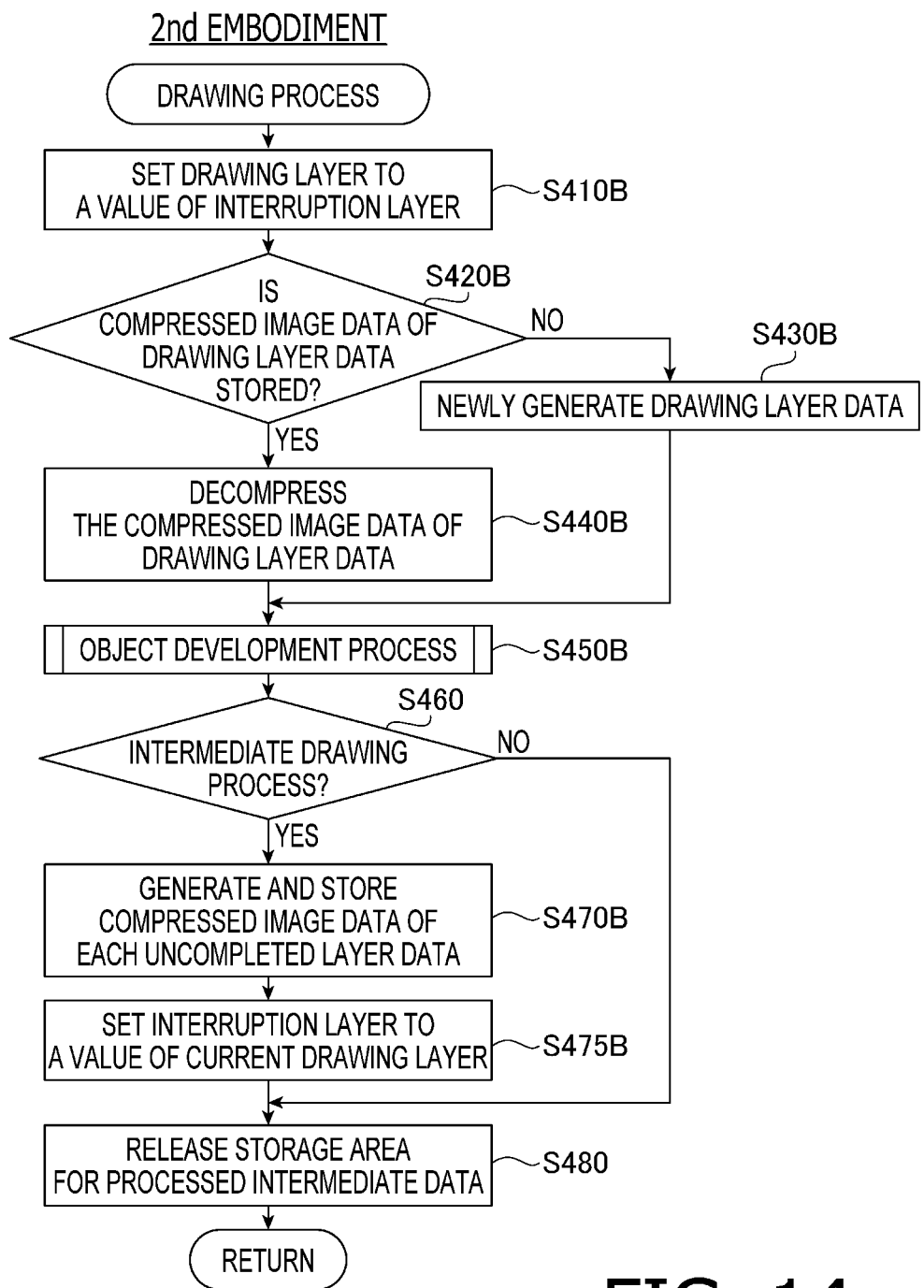
FIG. 14 is a flowchart showing a procedure of a drawing process by the CPU of the printer in the second illustrative embodiment according to one or more aspects of the present disclosure.

In the rasterization process of the second illustrative embodiment, the drawing process in S145 (see FIG. 5) and S340 (see FIG. 13) is different from that in the first illustrative embodiment. FIG. 14 is a flowchart showing a procedure of the drawing process in the second illustrative embodiment. In the drawing process shown in FIG. 14, a process of S410B to S450B is performed instead of a process of S410 to S450 in the drawing process shown in FIG. 9. Further, S470B and S475B are executed instead of S470 in the drawing process shown in FIG. 9.

In S410B, the CPU 210 sets the drawing layer to a value of the interruption layer. The interruption layer may be set to a value different from the initial value (i.e., the zeroth layer) when the intermediate drawing process has been performed prior to this point of time. The interruption layer is set to the initial value (i.e., the zeroth layer) when the intermediate drawing process has not been performed prior to this point of time.

In S420B, the CPU 210 determines whether compressed image data of drawing layer data (i.e., bitmap image data in the drawing layer) is stored in the work area 222. When the intermediate drawing process has been performed prior to this point of time, the compressed image data of the drawing layer data is stored in the work area 222.

When determining that the compressed image data of the drawing layer data is stored in the work area 222 (S420B: Yes), the CPU 210 decompresses the compressed image data of the drawing layer data (S440B). The decompressed image data (i.e., the drawing layer data) is stored into the work area 222. A storage area for the compressed image data of the drawing layer data is released at a point of time when the compressed image data has been decompressed.

When determining that the compressed image data of the drawing layer data is not stored in the work area 222 (S420B: No), the CPU 210 newly generates drawing layer data (S430B). In this case, since the drawing layer is the zeroth layer, zeroth layer data is newly generated. The generated zeroth layer data is stored not in the work area 222 but in the output data storage area 223.

In S450B, the CPU 210 performs the object development process. The object development process in S450B is slightly different from the object development process in the first illustrative embodiment. In the object development process of the second illustrative embodiment, S550B and S555B are executed just before S560 in FIG. 10B. The other steps of the object development process in the second illustrative embodiment are substantially the same as in the first illustrative embodiment.

When determining that the target intermediate data is end flag data (S520: Yes), the CPU 210 goes to S550B. In S550B, the CPU 210 determines whether layer data (i.e., bitmap data) in a layer that is one level lower in the hierarchy than the drawing layer has been compressed. For instance, when the intermediate drawing process has been performed prior to this point of time, compression image data of the layer data in the layer that is one level lower in the hierarchy than the drawing layer may be stored in the work area 222. In this case, it is determined that the layer data in the layer that is one level lower in the hierarchy than the drawing layer has been compressed.

When determining that the layer data in the layer that is one level lower in the hierarchy than the drawing layer has been compressed (S550B: Yes), the CPU 210 decompresses the compressed image data of the layer data (S555B). Namely, the compressed image data of the layer data is decompressed and stored into the work area 222. After the decompression, a storage area for the compressed image data is released.

When determining that the layer data in the layer that is one level lower in the hierarchy than the drawing layer has not been compressed (S550B: No), the CPU 210 skips S555B.

Referring back to FIG. 14, after completion of the object development process, the CPU 210 determines whether the intermediate drawing process is currently in progress (S460).

When the intermediate drawing process is currently in progress (S460: Yes), one or more pieces of layer data in which drawing has not been completed are stored in the work area 222 or in the output data storage area 223. For instance, in the object development process of S450B, when the second layer data, in which at least one object is drawn, has not been completed, the uncompleted zeroth layer data is stored in the output data storage area 223, and the uncompleted first layer data and the uncompleted second layer data are stored in the work area 222. In this case, in S470B, the CPU 210 compresses the one or more pieces of layer data in which drawing has not been completed, thereby generating compressed image data of each uncompleted layer data, and then stores the generated compressed image data into the work area 222. A storage area, for each layer data before the compression, is released.

In S475B, the CPU 210 sets the interruption layer to a value of the current drawing layer. Thereby, the value of the interruption layer, which is referred to when the intermediate drawing process is performed again after the intermediate drawing process currently in progress, is appropriately set.

When the intermediate drawing process is not currently in progress, i.e., when the final drawing process is currently in progress (S460: No), final zeroth layer data (i.e., final RGB image data) in which drawing is completed is stored in the output data storage area 223. In this case, the CPU 210 goes to S480 without executing S470B or S475B.

In S480, the CPU 210 releases a storage area for the intermediate data processed in the object development process of S450B, in substantially the same manner as in the first illustrative embodiment. Thereby, the free space in the work area 222 is increased. After completion of S480, the CPU 210 terminates the drawing process.

B-3. Specific Example of Rasterization Process

An explanation will be provided of a specific example of the rasterization process in the second illustrative embodiment described above, with reference to FIGS. 11 and 15. FIG. 15 illustrates a state of the work area 222 during the rasterization process in the second illustrative embodiment.

When the free space in the work area 222 is large enough, it is never determined that the free space in the work area 222 is less than the reference value TH1. Therefore, in this case, the intermediate drawing process of S130 (see FIG. 5) is not performed. In this case, since substantially the same process as in the first illustrative embodiment is performed, an explanation thereof will be omitted.

Next, an explanation will be provided of a case where the capacity of the work area 222 is not sufficient in the rasterization process. As shown in FIG. 11B, suppose for instance that it is determined that the free space in the work area 222 is less than the reference value TH1 (S125: Yes, in FIG. 5), at a point of time when up to the object data D31 which is the first object data in the group G3 has been generated and stored into the work area 222 among all pieces of the intermediate data to be generated (see FIG. 11A). In this case, at this point of time, the CPU 210 interrupts the process of generating intermediate data and storing the generated intermediate data into the work area 222 (S120 and S135 in FIG. 5), and performs the intermediate drawing process (S130 in FIG. 5).

In this case, the layer under processing is the third layer (S310: No, in FIG. 13) at the point of time when the intermediate drawing process is started. Therefore, the CPU 210 performs the process of S312B to S330B (see FIG. 13) to set the interruption group ID (S330B in FIG. 13). In other words, by the process of S312B to S330B (see FIG. 13), it is determined which layer a storage area for the intermediate data up to shall be released. Namely, a storage area, for the intermediate data in layers that are hierarchically lower than the layer for the group identified by the set interruption group ID, is released by the intermediate drawing process.

For instance, when the intermediate drawing process is started in a state where the work area 222 is as shown in FIG. 11B, the interruption group ID is set to one of the respective IDs of the groups G1 to G3 in the first to third layers and a virtual ID representing the fourth layer. In other words, in this case, a hierarchically highest layer among the layers for the intermediate data to be released is determined to be one of the zeroth to third layers.

FIG. 11C shows a state of the work area 22 after the intermediate drawing process in which the intermediate data in the zeroth layer is released. In this case, the storage area for the object data D01 to D03 in the zeroth layer is released, and the compressed image data CD0 of the zeroth layer data is stored in the work area 222.

Figure 15A:
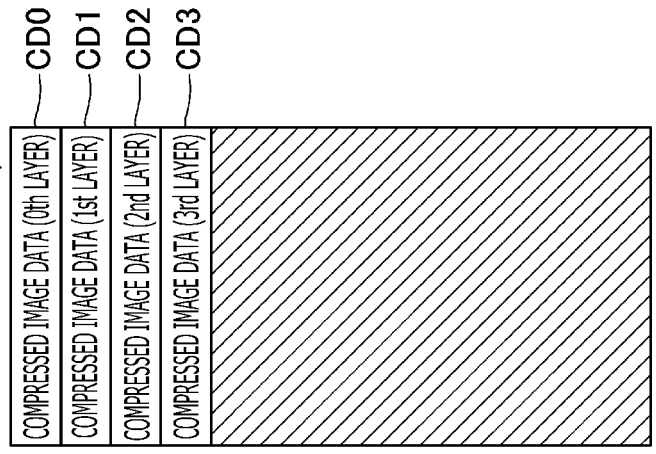
FIGS. 15A to 15C illustrate a change in the state of the work area during the rasterization process, in the second illustrative embodiment according to one or more aspects of the present disclosure.

FIG. 15A shows a state of the work area 222 after the intermediate drawing process in which the intermediate data in the zeroth and first layers is released. In this case, a storage area for the object data D01 to D03 in the zeroth layer and for the object data D11 and D12 in the first layer is released. Further, in this case, the compressed image data CD0 of the zeroth layer data and the compressed image data CD1 of the first layer data are stored in the work area 222.

Figure 15B:
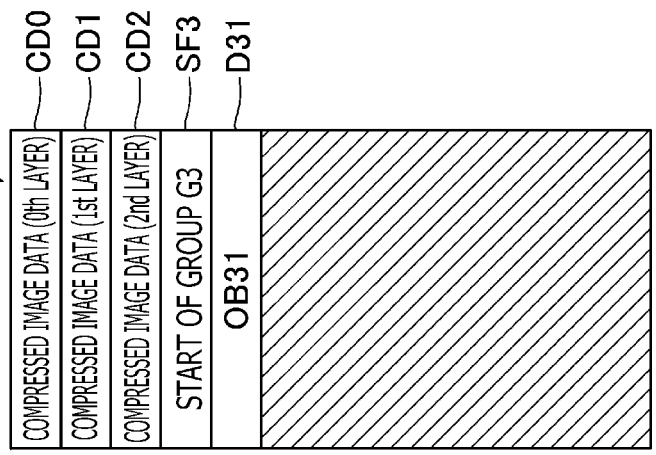

FIG. 15B shows a state of the work area 222 after the intermediate drawing process in which the intermediate data in the zeroth to second layers is released. In this case, a storage area for the object data D01 to D03 in the zeroth layer, the object data D11 and D12 in the first layer, and the object data D21 and D22 in the second layer is released. Further, in this case, the compressed image data CD0 of the zeroth layer data, the compressed image data CD1 of the first layer data, and the compressed image data CD2 of the second layer data are stored in the work area 222.

Figure 15C:
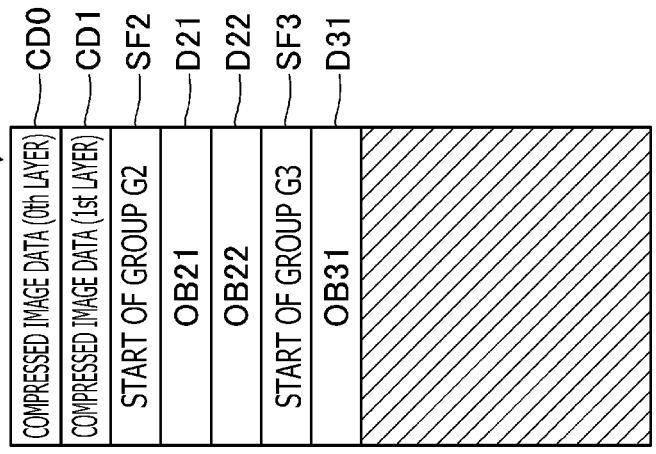

FIG. 15C shows a state of the work area 222 after the intermediate drawing process in which the intermediate data in the zeroth to third layers is released. In this case, a storage area for the object data D01 to D03 in the zeroth layer, the object data D11 and D12 in the first layer, the object data D21 and D22 in the second layer, and the object data D31 in the third layer is released. Further, in this case, the compressed image data CD0 of the zeroth layer data, the compressed image data CD1 of the first layer data, the compressed image data CD2 of the second layer data, and the compressed image data CD3 of the third layer data are stored in the work area 222.

In this example, the increase in free space is greater as the number of layers in which the intermediate data is released increases. On the other hand, the number of processes of compressing and decompressing uncompleted layer data increases as the number of layers in which the intermediate data is released increases. Compression and decompression are relatively high-load processes. Hence, a processing time required for the rasterization process increases as the number of layers in which the intermediate data is released increases. Therefore, in the second illustrative embodiment, by the process of S312B to S330B in FIG. 13, it is determined which layer a storage area for the intermediate data up to shall be released, in such a manner that the increase in free space is equal to or more than the reference value TH2 and that the number of layers which a storage area for the intermediate data in is released is as small as possible. Thus, it is possible to prevent the time required for the rasterization process (consequently, the time required for the printing process) from being excessively long. Further, it is possible to suppress adverse influences on the rasterization process due to insufficient free space in the work area 222.

The rasterization process of the second illustrative embodiment may include the following first to fifth processes, in substantially the same manner as in the first illustrative embodiment.

The first process includes analyzing the target image data (S120 in FIG. 5). The first process further includes generating the three pieces of object data D01 to D03 in the zeroth layer, which represent the three objects OB01 to OB03 in the zeroth layer that have the respective earlier orders than the combined object OB04 in the combining sequence among the five objects in the zeroth layer (S135 in FIG. 5). The first process further includes storing into the work area 222 the generated three pieces of object data D01 to D03 in the zeroth layer (S135 in FIG. 5).

The second process includes analyzing the target image data after completion of the first process (S120 in FIG. 5). The second process further includes generating the four pieces of object data D11, D12, G2, and D14 in the first layer that represent the four objects OB11 to OB14 in the first layer, respectively (S135 in FIG. 5). The second process further includes storing into the work area 222 the generated four pieces of object data D11, D12, G2, and D14 in the first layer (S135 in FIG. 5).

The third process includes using the three pieces of object data D01 to D03 in the zeroth layer, thereby generating the zeroth layer data that is bitmap data representing the image obtained by combining the three objects OB01 to OB03 in the zeroth layer (S525 in FIG. 10B to be performed when the target intermediate data is one of the object data D01 to D03).

The fourth process includes using the four pieces of object data D11, D12, G2, and D14 in the first layer, thereby generating the first layer data that is bitmap data representing the image (i.e., the combined object OB04) obtained by combining the four objects in the first layer (S525 in FIG. 10B).

The fifth process includes using the zeroth layer data generated in the third process and the first layer data generated in the fourth process, thereby generating the RGB image data (S560 in FIG. 10B to be performed when the target intermediate data is the end flag data EF1, and S525 in FIG. 10B to be performed when the target intermediate data is the object OB05).

In a first case where it is determined that the free space in the work area 222 is less than the reference value TH1 during the second process (S125: Yes, in FIG. 5), the CPU 210 interrupts the second process and performs the third process (i.e., the third process to be performed in the intermediate drawing process of S130 in FIG. 5), in substantially the same manner as in the first illustrative embodiment. After completion of the third process, the CPU 210 releases the storage area for the three pieces of object data D01 to D03 in the zeroth layer, in the work area 222 (S480 in FIG. 14). After the storage area for the three pieces of object data D01 to D03 in the zeroth layer is released, the CPU 210 completes the second process.

In a second case where it is not determined that the free space in the work area 222 is less than the reference value TH1 during the second process (S125: Always No, in FIG. 5), the CPU 210 performs the third process after completion of the second process.

Consequently, it is possible to suppress adverse influences on the rasterization process due to insufficient capacity of the work area 222 during the second process.

Furthermore, in the second illustrative embodiment, the object data D11, D12, and G2 in the first layer are generated in the specified combining sequence and stored into the work area 222. Then, in at least a partial case (specifically, when the intermediate data in layers that are hierarchically equal to or higher than the first layer is released in the intermediate drawing process (see FIGS. 15A to 15C)) of the aforementioned first case, the CPU 210 further performs the following processes (A) to (D).

(A) When the second process is interrupted, the CPU 210 performs a part of the fourth process (S525 in FIG. 10B to be executed during the intermediate drawing process), by generating the first layer data that represents an image (i.e., an uncompleted combined object OB04) obtained by combining the two objects OB11 and OB12 in the first layer, using the two pieces of object data D11 and D12 in the first layer that have been stored in the work area 222 at the time of the interruption of the second process among the four pieces of object data D11, D12, G2, and D14 in the first layer.

(B) After the generation of the uncompleted first layer data, the CPU 210 releases a storage area for the two pieces of object data D11 and D12 in the first layer, in the work area 222 (FIGS. 15A to 15C).

(C) After releasing the storage area for the two pieces of object data D11 and D12 in the first layer, the CPU 210 generates the two pieces of object data G2 (i.e., the object data in the group G) and D14, which have not been generated at the time of the interruption of the second process, among the four pieces of object data in the first layer, and stores the generated object data G2 and D14 into the work area 222, thereby completing the second process (e.g., S120 and S135 to be executed after the intermediate drawing process).

(D) After the completion of the second process, the CPU 210 generates the completed first layer data using the uncompleted first layer data and the two pieces of object data G2 and D14 in the first layer, thereby completing the fourth process (e.g., S525 in FIG. 10B to be executed in the drawing process of S145 in FIG. 5 after the intermediate drawing process).

Then, in the second case, the CPU 210 performs a process (E). In the process (E), after the completion of the second process, the CPU 210 performs the fourth process using the four pieces of object data D11, D12, G2, and D14 in the first layer that have been stored in the work area 222.

Consequently, even more pieces of intermediate data are released. Hence, it is possible to further suppress adverse influences on the rasterization process due to insufficient capacity of the work area 222 when the rasterization process is performed by grouping a plurality of objects into a plurality of hierarchical layers.

Further, in the second illustrative embodiment, when the aforementioned processes (A) to (E) are performed, the CPU 210 further performs a compression process (S470B in FIG. 14) of compressing the uncompleted first layer data generated in the process (A) and storing into the work area 222 the compressed first layer data (i.e., the compressed image data CD1 (see FIG. 15)). Then, the CPU 210 completes the second process after the compression process, and decompresses the compressed image data CD1 in the first layer after the completion of the second process (S440B in FIG. 14). The CPU 210 completes the fourth process using the decompressed first layer data. As a result, when the aforementioned processes (A) to (E) are performed, the compressed image data CD1 is stored in the work area 222. Therefore, it is possible to secure a free space in the work area 222 that is required for completing the second process and to hold the uncompleted first layer data in the work area 222.

Further, in the second illustrative embodiment, in the first case, the CPU 210 calculates the increase in free space (see FIG. 12) in a case where none of the processes (A) and (B) is performed, i.e., in a case of releasing only the intermediate data in the zeroth layer (S312B and S314B in FIG. 13). The CPU 210 determines to release the intermediate data in layers that are hierarchically equal to or higher than the first layer, when the increase in free space in the case of releasing only the intermediate data in the zeroth layer is less than the reference value TH2. Further, the CPU 210 determines to release only the intermediate data in the zeroth layer, when the increase in free space in the case of releasing only the intermediate data in the zeroth layer is equal to or more than the reference value TH2 (S318B to S330B in FIG. 13). In other words, the CPU 210 performs the aforementioned processes (A) to (D) when the increase in free space in the case of releasing only the intermediate data in the zeroth layer is less than the reference value TH2, and performs the aforementioned process (E) when the increase in free space in the case of releasing only the intermediate data of the zeroth layer is equal to or more than the reference value TH2.

Consequently, by using the calculation result of the increase in free space, it is possible to appropriately determine whether to perform the aforementioned processes (A) to (D), i.e., whether to release the intermediate data in layers that are hierarchically equal to or higher than the first layer. Thus, it is possible to suppress an excessive increase in the processing load to secure the free space.

Furthermore, in the second illustrative embodiment, as described with reference to FIG. 12, the CPU 210 calculates the data size of the compressed image data CD0 (i.e., the total compression size of the zeroth layer on the management table MT2 in FIG. 12), and calculates the increase in free space using the calculated data size. As a result, the increase in free space in the case where none of the processes (A) and (B) is performed is accurately calculated. Thus, it is possible to more appropriately determine whether to perform the aforementioned processes (A) to (D).

Hereinabove, the illustrative embodiments according to aspects of the present disclosure have been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

C. Modifications (1) The number (i.e., 5) of the objects in the zeroth layer that are included in the target image OI in the aforementioned first illustrative embodiment is just an example. Similarly, in the aforementioned second illustrative embodiment, the number of the objects in each layer that are included in the target image (e.g., the number (i.e., 5) of the objects in the zeroth layer, and the number (i.e., 4) of the objects in the first layer) is just an example. In general, the target image may include N ("N" is an integer equal to or more than 2) objects in the first layer. In addition, the N objects in the zeroth layer may include a combined object obtained by combining M ("M" is an integer equal to or more than 2) objects in the first layer. Then, in the first process of the first and second illustrative embodiments, n ("n" is an integer equal to or more than 1 and less than N) pieces of object data in the zeroth layer, which represent the corresponding n objects in the zeroth layer that have earlier orders than the combined object in the combining sequence among the N objects in the zeroth layer, are generated.

Further, in the process (A) of the second illustrative embodiment, uncompleted first layer data is generated using m1 ("m1" is an integer less than M) pieces of object data in the first layer that have been stored in the work area 222 among the M pieces of object data in the first layer. Then, in the process (C) of the second illustrative embodiment, m2 ("m2" is an integer equal to or less than (M-m1)) pieces of object data in the first layer, which have not been generated at the time of the interruption of the second process among the M pieces of object data in the first layer, are generated and stored.

(2) In the aforementioned second illustrative embodiment, when the intermediate drawing process is executed, the storage area for the intermediate data in the zeroth layer is always released. However, the storage area for the intermediate data in the zeroth layer may not be released. Instead, only a storage area for intermediate data in at least some of layers that are hierarchically equal to or higher than the first layer may be released. In this case, the CPU 210 may draw objects corresponding to the intermediate data to be released, in the layers for the intermediate data to be released, compress the layer data in which the corresponding objects have been drawn, and store the compressed layer data into the work area 222. Then, the CPU 210 may release the intermediate data to be released.

(3) In each of the aforementioned illustrative embodiments, the uncompleted zeroth layer data generated in the intermediate drawing process is compressed and stored into the work area 222 in the intermediate drawing process. Instead, however, the uncompleted zeroth layer data generated by the intermediate drawing process may be left stored in the output data storage area 223 without being compressed in the intermediate drawing process. In this case, when finally performing the drawing process in S145 of FIG. 5, the CPU 210 may combine an object to be next combined, with the uncompleted zeroth layer data stored in the output data storage area 223, thereby completing the zeroth layer data. In this case, a processing time required for compression of the zeroth layer data is unnecessary. Therefore, it is possible to prevent the time required for the rasterization process, in which the rasterization process, from being excessively long. Further, with respect to uncompleted layer data in layers that are hierarchically equal to or higher than the first layer, as well, the uncompleted layer data, generated in the intermediate drawing process of the second illustrative embodiment, may be stored in the output data storage area 223 without being compressed, for instance, when there is a free space in the output data storage area 223.

(4) In the aforementioned second illustrative embodiment, when the intermediate drawing process is performed, it is determined which layer a storage area for the intermediate data up to shall be released, depending on the increase in free space. Instead, for instance, a storage area for the intermediate data up to the hierarchically-highest layer may always be released. Further, in another instance, a storage area for the intermediate data up to a specific one (e.g., the second layer) of the hierarchical layers may always be released. Further, in yet another instance, a storage area for the intermediate data to be released may be determined to maximize the increase in free space.

(5) In each of the aforementioned illustrative embodiments, the target image data is a PDF file. However, the target image data may be an image file in another format. For instance, the target image data may be an image file in which the target image OI is described in another page description language. Specifically, for instance, the target image data may be an image file in an XPS ("XPS" is an abbreviation for "XML Paper Specification") format.

(6) In the rasterization process of each of the aforementioned illustrative embodiments, each layer data (bitmap data) is RGB image data. However, each layer data may be another type of bitmap data such as CMYK image data or dot data.

(7) The printer 200, as a data generating apparatus that performs the printing process shown in FIG. 2, may be another type of device, for instance, the terminal device 100. In this case, for instance, the terminal device 100 may operate as a printer driver by executing a driver program, and may perform the printing process shown in FIG. 2 as a part of its functions as the printer driver. The terminal device 100 may supply the print data generated in S50 of FIG. 2 to the printer 200, thereby causing the printer 200 to perform printing.

The data generating apparatus that performs the printing process shown in FIG. 2 may be, for instance, a server configured to obtain the target image data from the printer 200 or the terminal device 100 and perform image processing. Such a server may include a plurality of computers communicable with each other via a network. In this case, the whole of the plurality of computers communicable with each other via the network may correspond to the data generating apparatus.

(8) In each of the aforementioned illustrative embodiments, a part of the configuration realized by hardware may be replaced with software. Conversely, at least a part of the configuration realized by software may be replaced with hardware. For instance, some of the processes performed by the CPU 210 of the printer 200 shown in FIG. 1 may be achieved by specific hardware circuitry.

The following shows examples of associations between elements exemplified in the aforementioned illustrative embodiments and modifications and elements according to aspects of the present disclosure. The printer 200 may be an example of a "data generating apparatus" according to aspects of the present disclosure. The volatile memory 220 having the work area 222 may be an example of "a memory having a work memory" according to aspects of the present disclosure. A "controller" according to the present disclosure may include the CPU 210 and the non-volatile memory 230 storing the computer program PG. The CPU 210 may be an example of a "processor" according to the present disclosure. Further, the non-volatile memory 230 storing the computer program PG may be an example of "a non-transitory computer-readable medium storing computer-readable instructions" according to aspects of the present disclosure. The five objects OB01 to OB05 in the zeroth layer in the first illustrative embodiment may be an example of "N first-layer objects" according to aspects of the present disclosure. Further, the five objects OB01 to OB05 in the zeroth layer in the second illustrative embodiment may be an example of the "N first-layer objects" according to aspects of the present disclosure. The three objects OB11 to OB13 in the first layer in the first illustrative embodiment may be an example of "M second-layer objects" according to aspects of the present disclosure. Further, the four objects OB11 to OB14 in the first layer in the second illustrative embodiment may be an example of the "M second-layer objects" according to aspects of the present disclosure. The target image data may be an example of "first image data" according to aspects of the present disclosure. The RGB image data generated in the rasterization process may be an example of "second image data" according to aspects of the present disclosure.

What is claimed is:

1. A data generating apparatus comprising:
a memory having a work area;
a controller configured to:
obtain first image data that represents a target image in accordance with a particular description language, the target image including an image obtained by combining N ("N" is an integer equal to or more than 2) first-layer objects in a first combining sequence, the N first-layer objects including a combined image obtained by combining M ("M" is an integer equal to or more than 2) second-layer objects in a second combining sequence, at least one of combining the M second-layer objects and combining the combined object with the other first-layer objects including a color mixing process;
perform, using the work area, a generation process to generate second image data that represents the target image based on the obtained first image data, the second image data being bitmap data including a plurality of pieces of pixel data, the generation process comprising:
a first process comprising:
analyzing the first image data to generate n ("n" is an integer equal to or more than 1 and less than N) pieces of first-layer object data, the n pieces of first-layer object data representing n first-layer objects that have respective earlier orders than the combined object in the first combining sequence, among the N first-layer objects; and
storing the generated n pieces of first-layer object data into the work area;
a second process comprising:
after completion of the first process, analyzing the first image data to generate M pieces of second-layer object data representing the M second-layer objects; and
storing the generated M pieces of second-layer object data into the work area;
a third process to generate, using the n pieces of first-layer object data, first bitmap data representing an image obtained by combining the n first-layer objects;
a fourth process to generate, using the M pieces of second-layer object data, second bitmap data representing an image obtained by combining the M second-layer objects; and
a fifth process to generate the second image data using the first bitmap data and the second bitmap data;
determine whether a free space in the work area is less than a first reference value, during the second process;

in a first case of determining that the free space in the work area is less than the first reference value during the second process, perform:
  interrupting the second process, and performing the third process;
  after completion of the third process, releasing a storage area for the n pieces of first-layer object data in the work area; and
  after the storage area for the n pieces of first-layer object data is released, completing the second process; and
in a second case of not determining that the free space in the work area is less than the first reference value during the second process, perform the third process after completing the second process.

2. The data generating apparatus according to claim 1, wherein the controller is further configured to, in the first case, perform:
  compressing the first bitmap data generated in the third process;
  storing the compressed first bitmap data into the work area;
  completing the second process after the compressed first bitmap data is stored into the work area;
  decompressing the compressed first bitmap data after the completion of the second process; and
  performing the fifth process using the decompressed first bitmap data.

3. The data generating apparatus according to claim 1, wherein the controller is further configured to:
  in the second process, sequentially generate and store into the work area the M pieces of second-layer object data in the second combining sequence;
  in at least a partial case of the first case, perform:
    a process (A) to perform, when the second process is interrupted, a part of the fourth process by generating third bitmap data using m1 ("m1" is an integer less than M) pieces of second-layer object data that have been stored in the work area at a time of the interruption of the second process among the M pieces of second-layer object data, the third bitmap data representing an image obtained by combining m1 second-layer objects;
    a process (B) to release a storage area for the m1 pieces of second-layer object data in the work area after the generation of the third bitmap data;
    a process (C) comprising:
      after the storage area for the m1 pieces of second-layer object data is released, generating m2 ("m2" is an integer equal to or less than (M-m1)) pieces of second-layer object data that have not been generated at the time of the interruption of the second process among the M pieces of second-layer object data; and
      storing the generated m2 pieces of second-layer object data into work area, thereby completing the second process; and
    a process (D) to generate, after the completion of the second process, the second bitmap data using the third bitmap data and the m2 pieces of second-layer object data, thereby completing the fourth process; and
  in the second case, perform a process (E) to perform, after the completion of the second process, the fourth process using the M pieces of second-layer object data stored in the work area.

4. The data generating apparatus according to claim 3, wherein the controller is further configured to, in the at least a partial case of the first case, perform:
  compressing the third bitmap data generated after the interruption of the second process;
  storing the compressed third bitmap data into the work area;
  completing the second process after the compressed third bitmap data is stored into the work area;
  decompressing the compressed third bitmap data after the completion of the second process; and
  completing the fourth process using the decompressed third bitmap data.

5. The data generating apparatus according to claim 3, wherein the controller is further configured to:
  in the first case, calculate an increase in the free space when none of the processes (A) and (B) is performed;
  when the calculated increase in the free space is less than a second reference value in the first case, perform the processes (A) to (D); and
  when the calculated increase in the free space is equal to or more than the second reference value in the first case, perform the process (E).

6. The data generating apparatus according to claim 5, wherein the controller is further configured to:
  in the first case, compress the first bitmap data generated in the third process, and store the compressed first bitmap data into the work area;
  calculate a data size of the compressed first bitmap data; and
  calculate the free space using the calculated data size.

7. The data generating apparatus according to claim 1, wherein the controller is further configured to:
  in the first case, after the completion of the third process, release the storage area for the n pieces of first-layer object data without releasing a storage area for second-layer object data that has been stored at a time of the interruption of the second process, in the work area.

8. A data generating apparatus comprising:
a memory having a work area; and
a controller configured to:
  obtain first image data that represents a target image in accordance with a particular description language, the target image including an image obtained by combining N ("N" is an integer equal to or more than 2) first-layer objects in a first combining sequence, the N first-layer objects including a combined image obtained by combining M ("M" is an integer equal to or more than 2) second-layer objects in a second combining sequence, at least one of combining the M second-layer objects and combining the combined object with the other first-layer objects including a color mixing process;
  perform, using the work area, a generation process to generate second image data that represents the target image based on the obtained first image data, the second image data being bitmap data including a plurality of pieces of pixel data, the generation process comprising:
    a first process comprising:
      analyzing the first image data to generate n ("n" is an integer equal to or more than 1 and less than N) pieces of first-layer object data, the n pieces of first-layer object data representing n first-layer objects that have respective earlier orders than the combined object in the first combining sequence, among the N first-layer objects; and storing the generated n pieces of first-layer object data into the work area;

a second process comprising:
  after completion of the first process, analyzing the first image data to generate M pieces of second-layer object data representing the M second-layer objects; and
  storing the generated M pieces of second-layer object data into the work area;

a third process to generate, using the n pieces of first-layer object data, first bitmap data representing an image obtained by combining the n first-layer objects;

a fourth process to generate, using the M pieces of second-layer object data, second bitmap data representing an image obtained by combining the M second-layer objects; and a fifth process to generate the second image data using the first bitmap data and the second bitmap data;

determine whether a free space in the work area is less than a reference value, during the second process;

when determining that the free space in the work area is less than the reference value during the second process, perform:
  interrupting the second process, and performing a part of the fourth process by generating third bitmap data using m1 ("m1" is an integer less than M) pieces of second-layer object data that have been stored in the work area at a time of the interruption of the second process among the M pieces of second-layer object data, the third bitmap data representing an image obtained by combining m1 second-layer objects;
  after the generation of the third bitmap data, releasing a storage area for the m1 pieces of second-layer object data in the work area;
  after the storage area for the m1 pieces of second-layer object data is released, generating m2 ("m2" is an integer equal to or less than (M-m1)) pieces of second-layer object data that have not been generated at the time of the interruption of the second process among the M pieces of second-layer object data, and storing the m2 pieces of second-layer object data into the work area, thereby completing the second process; and
  after the completion of the second process, generating the second bitmap data using the third bitmap data and the m2 second-layer object data, thereby completing the fourth process; and when not determining that the free space in the work area is less than the reference value during the second process, perform the fourth process using the M pieces of second-layer object data stored in the work area, after completing the second process.

9. The data generating apparatus according to claim 8, wherein the controller is further configured to, when determining that the free space in the work area is less than the reference value during the second process, perform:
  compressing the third bitmap data generated after the interruption of the second process;
  storing the compressed third bitmap data into the work area;
  completing the second process after the compressed third bitmap data is stored into the work area;
  decompressing the compressed third bitmap data after the completion of the second process; and
  completing the fourth process using the decompressed third bitmap data.

10. A non-transitory computer-readable medium storing computer-readable instructions that are executable by a processor of a data generating apparatus comprising a memory having a work area, the instructions being configured to, when executed by the processor, cause the processor to:
  obtain first image data that represents a target image in accordance with a particular description language, the target image including an image obtained by combining N ("N" is an integer equal to or more than 2) first-layer objects in a first combining sequence, the N first-layer objects including a combined image obtained by combining M ("M" is an integer equal to or more than 2) second-layer objects in a second combining sequence, at least one of combining the M second-layer objects and combining the combined object with the other first-layer objects including a color mixing process;
  perform, using the work area, a generation process to generate second image data that represents the target image based on the obtained first image data, the second image data being bitmap data including a plurality of pieces of pixel data, the generation process comprising:
    a first process comprising:
      analyzing the first image data to generate n ("n" is an integer equal to or more than 1 and less than N) pieces of first-layer object data, the n pieces of first-layer object data representing n first-layer objects that have respective earlier orders than the combined object in the first combining sequence, among the N first-layer objects; and
      storing the generated n pieces of first-layer object data into the work area;
    a second process comprising:
      after completion of the first process, analyzing the first image data to generate M pieces of second-layer object data representing the M second-layer objects; and
      storing the generated M pieces of second-layer object data into the work area;
    a third process to generate, using the n pieces of first-layer object data, first bitmap data representing an image obtained by combining the n first-layer objects;
    a fourth process to generate, using the M pieces of second-layer object data, second bitmap data representing an image obtained by combining the M second-layer objects; and
    a fifth process to generate the second image data using the first bitmap data and the second bitmap data;
  determine whether a free space in the work area is less than a first reference value, during the second process;
  in a first case of determining that the free space in the work area is less than the first reference value during the second process, perform:
    interrupting the second process, and performing the third process;
    after completion of the third process, releasing a storage area for the n pieces of first-layer object data in the work area; and after the storage area for the n pieces of first-layer object data is released, completing the second process; and in a second case of not determining that the free space in the work area is less than the first reference value during the second process, perform the third process after completing the second process.

11. A non-transitory computer-readable medium storing computer-readable instructions that are executable by a processor of a data generating apparatus comprising a memory having a work area, the instructions being configured to, when executed by the processor, cause the processor to:

obtain first image data that represents a target image in accordance with a particular description language, the target image including an image obtained by combining N ("N" is an integer equal to or more than 2) first-layer objects in a first combining sequence, the N first-layer objects including a combined image obtained by combining M ("M" is an integer equal to or more than 2) second-layer objects in a second combining sequence, at least one of combining the M second-layer objects and combining the combined object with the other first-layer objects including a color mixing process;

perform, using the work area, a generation process to generate second image data that represents the target image based on the obtained first image data, the second image data being bitmap data including a plurality of pieces of pixel data, the generation process comprising:

a first process comprising:
analyzing the first image data to generate n ("n" is an integer equal to or more than 1 and less than N) pieces of first-layer object data, the n pieces of first-layer object data representing n first-layer objects that have respective earlier orders than the combined object in the first combining sequence, among the N first-layer objects; and
storing the generated n pieces of first-layer object data into the work area;

a second process comprising:
after completion of the first process, analyzing the first image data to generate M pieces of second-layer object data representing the M second-layer objects; and
storing the generated M pieces of second-layer object data into the work area;

a third process to generate, using the n pieces of first-layer object data, first bitmap data representing an image obtained by combining the n first-layer objects;

a fourth process to generate, using the M pieces of second-layer object data, second bitmap data representing an image obtained by combining the M second-layer objects; and a fifth process to generate the second image data using the first bitmap data and the second bitmap data;

determine whether a free space in the work area is less than a reference value, during the second process;

when determining that the free space in the work area is less than the reference value during the second process, perform:
interrupting the second process, and performing a part of the fourth process by generating third bitmap data using m1 ("m1" is an integer less than M) pieces of second-layer object data that have been stored in the work area at a time of the interruption of the second process among the M pieces of second-layer object data, the third bitmap data representing an image obtained by combining m1 second-layer objects;

after the generation of the third bitmap data, releasing a storage area for the m1 pieces of second-layer object data in the work area;

after the storage area for the m1 pieces of second-layer object data is released, generating m2 ("m2" is an integer equal to or less than (M-m1)) pieces of second-layer object data that have not been generated at the time of the interruption of the second process among the M pieces of second-layer object data, and storing the m2 pieces of second-layer object data into the work area, thereby completing the second process; and after the completion of the second process, generating the second bitmap data using the third bitmap data and the m2 second-layer object data, thereby completing the fourth process; and when not determining that the free space in the work area is less than the reference value during the second process, perform the fourth process using the M pieces of second-layer object data stored in the work area, after completing the second process.

12. A method implementable on a processor of a data generating apparatus comprising a memory having a work area, the method comprising:

obtaining first image data that represents a target image in accordance with a particular description language, the target image including an image obtained by combining N ("N" is an integer equal to or more than 2) first-layer objects in a first combining sequence, the N first-layer objects including a combined image obtained by combining M ("M" is an integer equal to or more than 2) second-layer objects in a second combining sequence, at least one of combining the M second-layer objects and combining the combined object with the other first-layer objects including a color mixing process;

performing, using the work area, a generation process to generate second image data that represents the target image based on the obtained first image data, the second image data being bitmap data including a plurality of pieces of pixel data, the generation process comprising:

a first process comprising:
analyzing the first image data to generate n ("n" is an integer equal to or more than 1 and less than N) pieces of first-layer object data, the n pieces of first-layer object data representing n first-layer objects that have respective earlier orders than the combined object in the first combining sequence, among the N first-layer objects; and
storing the generated n pieces of first-layer object data into the work area;

a second process comprising:
after completion of the first process, analyzing the first image data to generate M pieces of second-layer object data representing the M second-layer objects; and
storing the generated M pieces of second-layer object data into the work area;

a third process to generate, using the n pieces of first-layer object data, first bitmap data representing an image obtained by combining the n first-layer objects;

a fourth process to generate, using the M pieces of second-layer object data, second bitmap data representing an image obtained by combining the M second-layer objects; and a fifth process to generate the second image data using the first bitmap data and the second bitmap data;

determining whether a free space in the work area is less than a first reference value, during the second process;

in a first case of determining that the free space in the work area is less than the first reference value during the second process, performing:

interrupting the second process, and performing the third process;

after completion of the third process, releasing a storage area for the n pieces of first-layer object data in the work area; and after the storage area for the n pieces of first-layer object data is released, completing the second process; and in a second case of not determining that the free space in the work area is less than the first reference value during the second process, performing the third process after completing the second process.

13. A method implementable on a processor of a data generating apparatus comprising a memory having a work area, the method comprising:

obtaining first image data that represents a target image in accordance with a particular description language, the target image including an image obtained by combining N ("N" is an integer equal to or more than 2) first-layer objects in a first combining sequence, the N first-layer objects including a combined image obtained by combining M ("M" is an integer equal to or more than 2) second-layer objects in a second combining sequence, at least one of combining the M second-layer objects and combining the combined object with the other first-layer objects including a color mixing process;

performing, using the work area, a generation process to generate second image data that represents the target image based on the obtained first image data, the second image data being bitmap data including a plurality of pieces of pixel data, the generation process comprising:

a first process comprising:

analyzing the first image data to generate n ("n" is an integer equal to or more than 1 and less than N) pieces of first-layer object data, the n pieces of first-layer object data representing n first-layer objects that have respective earlier orders than the combined object in the first combining sequence, among the N first-layer objects; and storing the generated n pieces of first-layer object data into the work area;

a second process comprising:

after completion of the first process, analyzing the first image data to generate M pieces of second-layer object data representing the M second-layer objects; and storing the generated M pieces of second-layer object data into the work area;

a third process to generate, using the n pieces of first-layer object data, first bitmap data representing an image obtained by combining the n first-layer objects;

a fourth process to generate, using the M pieces of second-layer object data, second bitmap data representing an image obtained by combining the M second-layer objects; and a fifth process to generate the second image data using the first bitmap data and the second bitmap data;

determining whether a free space in the work area is less than a reference value, during the second process;

when determining that the free space in the work area is less than the reference value during the second process, performing:

interrupting the second process, and performing a part of the fourth process by generating third bitmap data using m1 ("m1" is an integer less than M) pieces of second-layer object data that have been stored in the work area at a time of the interruption of the second process among the M pieces of second-layer object data, the third bitmap data representing an image obtained by combining m1 second-layer objects;

after the generation of the third bitmap data, releasing a storage area for the m1 pieces of second-layer object data in the work area;

after the storage area for the m1 pieces of second-layer object data is released, generating m2 ("m2" is an integer equal to or less than (M-m1)) pieces of second-layer object data that have not been generated at the time of the interruption of the second process among the M pieces of second-layer object data, and storing the m2 pieces of second-layer object data into the work area, thereby completing the second process; and after the completion of the second process, generating the second bitmap data using the third bitmap data and the m2 second-layer object data, thereby completing the fourth process; and when not determining that the free space in the work area is less than the reference value during the second process, performing the fourth process using the M pieces of second-layer object data stored in the work area, after completing the second process.

* * * * *